United States Patent
Ohnishi et al.

(10) Patent No.: US 6,525,932 B1
(45) Date of Patent: Feb. 25, 2003

(54) EXPANSION UNIT AND ELECTRONIC APPARATUS

(75) Inventors: Masuo Ohnishi, Kawasaki (JP); Hidehiko Fuchida, Kawasaki (JP); Tsuyoshi Takimoto, Kawasaki (JP); Atsuko Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/639,772

(22) Filed: Aug. 16, 2000

(30) Foreign Application Priority Data

Aug. 18, 1999 (JP) ............................................ 11-232044

(51) Int. Cl.⁷ ................................................. G06F 1/16
(52) U.S. Cl. ...................... 361/686; 361/756; 312/223.2; 235/395
(58) Field of Search ...................... 361/686, 680–683, 361/725–727, 741, 754, 756; D6/396, 397; D14/100, 114; 439/607; 312/223.2; 235/395; 713/300

(56) References Cited

U.S. PATENT DOCUMENTS

| | | | |
|---|---|---|---|
| 5,375,037 A | 12/1994 | Le Roux | 361/684 |
| 5,455,746 A | 10/1995 | Sato et al. | 361/816 |
| 5,486,687 A | 1/1996 | Le Roux | 253/382 |
| 5,537,293 A | 7/1996 | Kobayashi et al. | 361/737 |
| 5,559,932 A | 9/1996 | Machida et al. | 395/114 |
| 5,606,519 A | 2/1997 | Viletto | 364/708.1 |
| 5,606,732 A | 2/1997 | Vignone, Sr. | 455/269 |
| 5,617,301 A | 4/1997 | Sato et al. | 361/796 |
| 5,627,731 A | 5/1997 | Sato et al. | 361/796 |
| 5,629,602 A | 5/1997 | Makino | 320/6 |
| 5,867,218 A | 2/1999 | Matsuzaki et al. | 348/373 |
| 5,917,545 A | 6/1999 | Kowno et al. | 348/231 |
| 5,930,409 A * | 7/1999 | Ohtani | 382/311 |
| 5,938,770 A * | 8/1999 | Kim | 713/300 |
| 6,009,492 A | 12/1999 | Matsuoka | 710/129 |
| 6,157,958 A * | 12/2000 | Armitage et al. | 709/250 |
| 6,213,395 B1 * | 4/2001 | Dejaeger et al. | 235/383 |
| 6,223,250 B1 | 4/2001 | Yokono et al. | 711/114 |
| 6,373,706 B1 | 4/2002 | Kasahara et al. | 361/725 |

FOREIGN PATENT DOCUMENTS

| | | |
|---|---|---|
| EP | 0 618 525 A2 | 10/1994 |
| EP | 0 680 112 A2 A3 | 11/1995 |
| EP | 0 683 596 A2 A3 | 11/1995 |
| EP | 0 705 037 A2 A3 | 4/1996 |
| EP | 0 778 551 A2 | 6/1997 |
| EP | 0 864 996 A2 A3 | 9/1998 |
| EP | 0 869 420 A2 A3 | 10/1998 |
| EP | 0 890 905 A2 | 1/1999 |
| EP | 0 987 618 A1 | 3/2000 |
| JP | 59-138920 | 9/1984 |
| JP | 2-93821 | 4/1990 |
| JP | 03164953 A | 7/1991 |
| JP | 4-205328 | 7/1992 |
| JP | 5-66855 | 3/1993 |
| JP | 5-257897 | 10/1993 |
| JP | 5-342162 | 12/1993 |

(List continued on next page.)

OTHER PUBLICATIONS

Fujitsu FM V–5133NU/W, 5133NU7/Y, FM V–BIBLO Guide, Nov. 1997.

(List continued on next page.)

Primary Examiner—Darren Schuberg
Assistant Examiner—Hung Van Duong
(74) Attorney, Agent, or Firm—Armstrong, Westerman & Hattori, LLP

(57) ABSTRACT

The present invention has an exemplified object to provide an expansion unit and electronic apparatus that may render the electronic apparatus multifunctional while maintaining its compact, lightweight, and low-profile body. To achieve this object, the expansion unit that can be inserted into an expansion unit slot in a portable electronic apparatus is so configured as to partially project from the expansion unit slot.

83 Claims, 20 Drawing Sheets

FOREIGN PATENT DOCUMENTS

| | | |
|---|---|---|
| JP | 6-43965 | 2/1994 |
| JP | 6-75661 | 3/1994 |
| JP | 6-102967 | 4/1994 |
| JP | 7-5956 | 1/1995 |
| JP | 7-79566 | 3/1995 |
| JP | 3011657 | 3/1995 |
| JP | 7-104895 | 4/1995 |
| JP | 7-104896 | 4/1995 |
| JP | 7-093065 | 7/1995 |
| JP | 07219689 | 8/1995 |
| JP | 7-234744 | 9/1995 |
| JP | 7-302140 | 11/1995 |
| JP | 7-303052 | 11/1995 |
| JP | 07239926 | 12/1995 |
| JP | 7-322117 | 12/1995 |
| JP | 8-9215 | 1/1996 |
| JP | 8-22521 | 1/1996 |
| JP | 8-76879 | 3/1996 |
| JP | 8-98076 | 4/1996 |
| JP | 8-510578 | 11/1996 |
| JP | 9-6548 | 1/1997 |
| JP | 9-16491 | 1/1997 |
| JP | 9-83538 | 3/1997 |
| JP | 9-128091 | 5/1997 |
| JP | 9-130659 | 5/1997 |
| JP | 9-200830 | 7/1997 |
| JP | 9-223206 | 8/1997 |
| JP | 9-237141 | 9/1997 |
| JP | 9-259238 | 10/1997 |
| JP | 10-35957 | 2/1998 |
| JP | 10-75320 | 3/1998 |
| JP | 2762942 | 3/1998 |
| JP | 10-271376 | 10/1998 |
| JP | 10-283066 | 10/1998 |
| JP | 10-283449 | 10/1998 |
| JP | 10-312459 | 11/1998 |
| JP | 11-31025 | 2/1999 |
| JP | 11-39483 | 2/1999 |
| JP | 11-53060 | 2/1999 |
| JP | 11-88485 | 3/1999 |
| JP | 11-88486 | 3/1999 |
| JP | 11-88487 | 3/1999 |
| JP | 11-105359 | 4/1999 |
| JP | 11-110533 | 4/1999 |
| JP | 11-119878 | 4/1999 |
| JP | 2000-89853 | 3/2000 |
| JP | 2000-91756 | 3/2000 |
| WO | WO 94/27268 | 11/1995 |

OTHER PUBLICATIONS

Fujitsu FM V–5120NU2/W, 5120NU2/Y, FM V–BIBLO Guide, Nov. 1996.

Panasonic Let's note/C33EA Brochure, Matsushita Electric Industrial Co., Ltd., Jun. 1999.

Panasonic Personal Computer Operation Manual, Product No. CF–L1 Series, Let's Note, Matsushita Electric Industrial Co., Ltd., Sep. 1999.

PC Watch article on the Internet, Sony adapts reflection type LCD and includes GPS antenna for PCG–C2GPS, Reported by Impress Co., Ltd., Nov. 4, 1999.

Press Release *Fujitsu Introduces the Worlds Smallest Scanner: The Rapidscan RS–10,* Fujitsu Limited, 1998–0010.

Press Release on the Internet, Color Mobile Scanner "Rapidscan RS–C30" released, Fujitsu, Ltd., Jan. 17, 2000.

Fujitsu "Rapidscan RS–30" Brochure, Fujitsu, Ltd., Jan. 2000.

Sony VA10 PCCG–C1S Brochure, Sony Corporation, May 1999.

Sony homepage product ad on the Internet, VAIO notebook computer PCG–C2GPS, Sony Marketing (Japan) Inc., Nov. 4, 1999.

Toshiba Libretto ff 1100 Brochure, Toshiba Corporation, Jun. 1999.

Victor Mobile PC "InterLink" MP–C101 Press Release on the Internet, Victor Company of Japan, Limited, Jun. 21, 1999.

Sony notebook computer VAIO series, new product "PCG–C2GPS", press release on the Internet, Sony Marketing (Japan), Inc., Nov. 4, 1999.

Mobile Daily News, Panasonic Let's note L1A, press release on the Internet, Matsushita Electric Industrial Co., Ltd., Nov. 10, 1999.

U.S. patent application Ser. No. 2002/0027769, Kasahara, et al.

U.S. patent application Ser. No. 2002/0008437, Tanaka, et al.

Office Action from Japanese Patent Office dated May 9, 2002 for application No. 2002–240146 (Translation of Note included).

\* cited by examiner

EXPANSION UNIT AND ELECTRONIC APPARATUS

BACKGROUND OF THE INVENTION

The present invention relates generally to peripheral equipment for use with a notebook personal computer ("notebook PC") or portable terminal, a portable electronic apparatus or a personal digital assistant ("PDA"), and other electronic apparatuses, and more particularly to an expansion unit for use with the electronic apparatus or hardware. The "peripheral equipment", as used herein. is such hardware as is connectable with a PC body and realizes a necessary function. It may be roughly categorized in terms of its use into an external storage device such as a hard disk drive, an output device such as a printer, an input device such as a mouse and a scanner, and a communication device such as a modem and a network connection device. The "expansion unit" may conceptually include a docking station, a docking bay (device), and an expansion bay (device), etc., and indicate an interface device that is connectible commonly to various units having diverse specifications to provide a connection between the unit and an electronic apparatus. Accordingly, the expansion unit differs from a PC card in that it easily makes the unit multifunctional.

The recent development and spread of notebook PCs, portable terminals and portable electronic apparatuses have increasingly demanded compact and lightweight notebook PCs for portability purposes which nevertheless exhibit such affluent functions on a desk in an office as a desktop personal computer ("desktop PC"). For example, a PC body is made light and CD-ROM drives etc. that are connectible to or built in it have been proposed. However, a CD-ROM drive, if built in the computer body, would bulk up the body and deteriorate its portability. Those drives which are different in specification, such as a CD-ROM drive and a high-density floppy disk (LS-120), use different connectors for connection with the PC body. An attempt to functionally expand a notebook PC would thus need a plurality of connectors preventing the miniaturization of the PC body. In other words, the conventional notebook PC cannot include multiple connectors for miniaturization purposes, and thus cannot become multifunctional.

Therefore, various methods of functionally expanding notebook PCs, portable terminals, and portable electronic apparatuses have hitherto been proposed. For example, a prior art has proposed to realize multifunction notebook PCs using a PC card. The "PC card" is a standard of card-type peripheral equipment for PCs that has been jointly developed by PCMCIA (Personal Computer Memory Card International Association) and JEIDA (Japan Electronic Industries Development Association). The PC card has a size of 85.6 mm×54 mm, and three types I, II, and III according to its thickness (of 3.3 mm, 5.0 mm and 10.5 mm, respectively) or four types further including Thick Type having a thickness of 18.0 mm.

Japanese Laid-Open Patent Application No. 11-31025 has proposed to functionally expand a notebook PC using PC cards having a plurality of thicknesses (i.e., a plurality of types). As shown in FIG. 2 of the reference, a PC card slot is provided in the notebook PC. The slot is connected to a cutaway portion, which is covered with a rotatable cover under the PC body. The notebook PC of the reference is configured to be connectible both to the PC card of Type II (two pieces at maximum), and to the PC card of Type III that is thicker than Type II. The PC card of Type II is inserted into the slot with its cutaway portion remaining covered. When the PC card of Type III is inserted, the cover is rotated in such a manner as to uncover the cutaway portion, and the PC card of Type III is plugged in the slot and cutaway portion so as to partially project the card from the bottom of the notebook PC.

Japanese Laid-Open Patent Application No. 7-219689 (or U.S. Pat. No. 5,559,932) has proposed a printer built-in notebook PC by mounting the printer in a Type II or III PC card. The PC card is inserted from a side of the PC so that a part of the card may be projected from the PC body.

Japanese Laid-Open Patent Application No. 7-303052 (or U.S. Pat. No. 5,606,732) has proposed a notebook PC that can establish wireless communications using radio frequency signals by attaching a wireless communication device comprised of an antenna and a GPS receiver to a PC card. The PC card is inserted from a side of a PC so that the antenna and the GPS receiver may project from a side of the PC. Japanese Laid-Open Patent Application No. 9-259238 has proposed a GPS device that may be inserted into a PC card slot. In this GPS device, an antenna portion is joined in a manner permitting a mechanical movement thereof with a GPS receiving processor portion that is inserted into the PC card slot. The GPS device is characterized in that the antenna part pivotably supported, while keeping bent, on a receiving part.

Japanese Laid-Open Patent Applications Nos. 11-88486 and 11-88487 have proposed notebook PCs that may serve as a communication device by installing in a PC card a cellular phone holder electrically connectible to a cellular phone. The cellular phone holder may be electrically connected to and hold the cellular phone. The PC card is inserted so that the cellular phone holder and the cellular phone may project from a side of the PC body.

Japanese Laid-Open Patent Application No. 9-128091 discloses a notebook computer that has an image pickup device connectible to a PC card with a cable. However, an image pickup portion including an image-pickup lens is still too large for portability. Japanese Laid-Open Patent Application No. 10-271376 has proposed a CCD camera built-in notebook PC that has improved portability by mounting the entire CCD camera onto the PC card. Japanese Laid-Open Patent Application Nos. 8-9215 (or U.S. Pat. No. 5,867,218) and 7-322117 (or European Patent Application No. 683,596) also disclose techniques of building a CCD camera in a card-shaped housing.

Attachment techniques of a CCD camera or other USB-compatible units through a USB port instead of a PC card are known in the art as well. For example, Japanese Laid-Open Patent Application No. 11-53060 discloses a notebook PC equipped with a CCD-camera USB port at a top of its display section so that the camera is connectible directly or via cable to the USB port. The USB port is compatible with a printer or keyboard in addition to the CCD camera.

Japanese Utility-Model Registration No. 3011657 discloses an electronic camera that may be detachably stored in a concave portion provided on a desktop PC body and connected via a connector with the PC body in the concave portion. The concave portion is called bay in the reference, but actually a storage space dedicated to the electronic camera.

While the above-mentioned Japanese Laid-Open Patent Application No. 11-31025 discloses a slot which supports two types of the PC card, i.e., Type II and Type III, Japanese Laid-Open Patent Application No. 6-102967 (or U.S. Pat.

Nos. 5,455,746, 5,617,301 and 5,627,731) discloses a slot which supports four types of the PC card, i.e., Types I to III and Thick Type.

Japanese Laid-Open Patent Application No. 11-31025 discloses a plurality of slots each capable of storing a Type II PC cards, but a device connectable to a notebook PC via a cable which device has a single slot capable of storing a plurality of PC cards is also known. For example, Japanese Laid-Open Patent Application No. 9-6548 (or U.S. patent application Ser. No. 666,938) discloses a disk array device having a connector connectible to a PC and including a plurality of PC card slots each capable of storing a PC card.

Several Notebook PCs and other electronic apparatuses compatible with an expansion unit have also been proposed. For example, Japanese Laid-Open Patent Applications Nos. 6-75661 and 7-302140 disclose an electronic apparatus selectively connectible to a PC-card or removable-memory expansion unit. Japanese Laid-Open Patent Application No. 10-283066 (or European Patent Application No. 869,420) discloses a notebook PC selectively connectible to an expansion unit for a hard disk drive or a data transceiver expansion unit for a wireless network connection. An apparatus equipped with a wireless communication function is also disclosed as a portable computer having an antenna and a slot for an optional device in Japanese Laid-Open Patent Application No. 5-257897.

A concave space, into which peripheral equipment can be inserted into the PC body, has been conventionally called a bay. Particularly, some portable information processors (which include, and will hereinafter include as well, portable PCs, notebook computers or portable electronic apparatuses) are provided with a bay, into which various kinds of expansion units (peripheral equipment or the like, such as a FDD, a HDD and a CD-ROM drive) can be inserted. This bay is configured to allow a user to detachably insert an expansion unit into the bay, and in many cases the user can select one from a plurality of expansion units (peripheral equipment or the like, such as an FDD and a HDD, a CD-ROM drive) and insert it into the bay. Specifically, a user may have a plurality of expansion units beforehand, and as necessary, insert/detach these expansion units into/from the bay to use them. For example, a user, when wishing to use a floppy disk, may insert an FDD into the bay to make a floppy disk available. Then the user, if wishing to use a CD-ROM, may eject the FDD out of the bay and insert the CD-ROM drive to make a CD-ROM available. The bay in a portable information processor differs substantially from a bay or slot in a desktop information processor in that a user can readily attach and detach the expansion unit. The bay that the desktop information processor may include is so configured as to fasten inserted peripheral equipment undetachably using screws. The portable information processor requires a bay because the processor does not have sufficient volume/area to accommodate all necessary devices and apparatuses. For example, a potable information processor may include both of an FDD and a CD-ROM drive, but becomes bulk because of much volume/area occupied by these devices. The more peripheral devices the user wants, the bigger the apparatus becomes. Thus a portable information processor would not be made small. Accordingly, as stated above, such a configuration is adopted to select one from a plurality of expansion units and attach it to a bay in a user-detachable manner. This kind of bay is provided in a variety of notebook computers, portable information processors, portable personal computers, and portable electronic apparatuses. Some of these apparatuses include a plurality of such bays. Moreover, attachable expansion units include not only an FDD and a CD-ROM drive but a DVD drive, a battery unit, and the like. The above bay may be termed differently, as may be called expansion bay, expansion bay slot, and multi-purpose bay.

Several printers that may be inserted into a bay have been proposed. For instance, Japanese Laid-Open Patent Application No. 10-35957 discloses a printer that may be mounted in a 5-inch drive bay. This printer includes a switch-back type paper feed path to realize a thin printer body. In addition, Japanese Laid-Open Patent Application No. 11-105359 discloses a thermal printer that may be mounted in a 3.5-inch drive bay.

Japanese Laid-Open Patent Application No. 5-342162 discloses an AC adapter that may be inserted into a battery storage portion to establish connection. The battery storage portion is originally designed for a battery pack storage space. The battery pack storage portion is configured to fix and hold a battery pack in a storage state when it accommodates the battery pack, and to allow the battery pack to be detached. The AC adapter has substantially the same shape as that of the battery pack. Japanese Laid-Open Patent Application No. 7-79566 discloses another embodiment of the AC adapter that may be inserted into a battery storage portion to establish connections. This AC adapter has a structure that allows its AC cord to be wrapped around the AC adapter itself. For instance, when a notebook PC is carried, the AC cord is wrapped around the AC adapter, and then the AC adapter is stored in the battery pack. Thereby, the AC cord is prevented from hanging down. However, the above AC adapter may be used only for the battery storage portion, and has no potential for expansion.

Although current functional expansion devices functionally expand electronic apparatuses, further functional expansion is being expected. Areas to be functionally expanded include a wide range, e.g., a storage system, a communication system, a printing system, an input system, and a security system.

In order to functionally expand the electronic apparatus, it is firstly conceivable to provide an expansion slot including a PC card slot to the electronic apparatus, and connect a dedicated functional expansion device to the expansion slot. Hereupon, the "expansion slot" is a slot for connecting peripheral equipment with an electronic apparatus or accommodating a functional expansion card therein, and may be called an expansion bus slot. However, as described above, a conventional notebook PC cannot include many connectors so as to miniaturize its body, while each slot generally has a terminal shape dedicated to only one functional expansion device. Thus, the functional expansion by increasing the number of expansion slots has a limitation.

On the other hand, the functional expansion using only a PC card and PC card slot also has a limitation. The PC card slot may be conveniently used for multifunction purposes where the PC card is configured to be connectible with or include a printer or CCD camera. However, originally, the development of PC cards has not expected the PC card to be connected to those devices which include a storage system, a communication system, a printing system, an input system, and a security system. Thus, there are connection difficulties as well as packing difficulties.

Furthermore, a size of a conventional bay (such as an expansion bay and a multi-purpose bay) has depended upon a thickness of a notebook computer, a portable information processor, a portable personal computer, or a portable electronic apparatus. In addition, a space/thickness that an expansion bay may occupy tends to decrease, with the trend moving toward a reduced size and thickness of a portable electronic apparatus, etc. A portable information processor that is given high priority to its portability is required to have a compact, lightweight and thin body, so that some devices have only a PC card slot and other devices have no expansion bay. Some portable information processor has an expansion bay not internally but externally.

Thus, the inventors have found that it is preferable to enhance functions of an electronic apparatus by using an expansion unit that intrinsically aims at multiple functions and an expansion bay that is connected to the electronic apparatus to accommodate the expansion unit. An effective expansion of a desired function among a storage system, a communication system, a printing system, an input system, and a security system has not been available. In addition, an electronic apparatus must be kept compact, lightweight and thin.

BRIEF SUMMARY OF THE INVENTION

Therefore, it is an exemplified general object of the present invention to provide a novel and useful expansion unit and electronic apparatus in which the above disadvantages are eliminated.

Another exemplified and more specific object of the present invention is to provide an expansion unit and electronic apparatus in which the expansion unit may keep the electronic apparatus small, lightweight and thin while expand functions of the apparatus more effectively.

In order to achieve the above objects, an expansion unit as an exemplified embodiment of the present invention comprises a housing which can be inserted into an expansion bay slot in an electronic apparatus in a detachable manner, and a connector which is provided on the housing and electrically connectible with the electronic apparatus, wherein the housing partially projects from a bottom or other portion of the electronic apparatus when the housing is inserted into the electronic apparatus and the connector is connected with the electronic apparatus. Such an expansion unit, as partially projecting from the electronic apparatus, does not require a large body of the electronic apparatus for accommodating the entire body of the expansion unit, therefore contributing to realizing enhanced multi-functionality of the electronic apparatus that retains its compact, lightweight, and low-profile body.

The projecting portion of the housing may serve as a stand (e.g., tilt stand) for the electronic apparatus. This may allow an expansion unit to facilitate electronic-apparatus user's operations in terms of ergonomics. The housing may include a card slot into which a card can be inserted. The expansion unit may expand functions of the card for the electronic apparatus. The connector may have an interface that can transmit a CardBus signal for a card, an interface that can transmit a PCI bus signal, a USB interface that can transmit a USB signal, and/or an interface that can transmit a file signal including data and programs the electronic apparatus can handle. This may provide an expansion unit capable of effectively extending a desired function among a storage system, a communication system, a printing system, an input system, and a security system.

The expansion unit may further include an image pickup device in the housing. This may provide an expansion unit capable of achieving an image pickup function of the electronic apparatus. The expansion unit may include a mechanism that is connected with the housing and allows the image pickup device to project from the housing, and the mechanism may be such that allows the image pickup device to project from the housing (e.g., pop-up mechanism). The mechanism serves to facilitate user operations. The electronic apparatus may include a display device, and the image pickup device may be mounted onto the housing in a detachable manner. The expansion unit may further include a cable that connects the image pickup device to the housing, and a mounting mechanism that allows the image pickup device that has been detached, to be mounted onto the display device of the electronic apparatus. This can ensure a wide image-shooting range of the image pickup device.

The expansion unit may further include a security device in the housing, and the security device may be a biometric device (or device using biological information), which may be any one of a fingerprint recognition device, a voiceprint recognition device, and a retina recognition device. This may provide an expansion unit that can expand a security function of the electronic apparatus.

The expansion unit may further include a wireless communication device or AC adapter in the housing. This may provide an expansion unit that can expand a communication or power function of the electronic apparatus.

An expansion unit as another exemplified embodiment of the present invention comprises a housing that can be inserted into an expansion bay slot in an electronic apparatus in a detachable manner, and a connector that is provided on the housing and electrically connectible with the electronic apparatus, wherein the connector has a USB interface that can transmit a USB signal. This may provide an expansion unit that can add a USB function to the electronic apparatus. The expansion unit may further comprise a USB terminal connectible with an external device. This may provide an expansion unit that facilitates an expansion of USB connector to the electronic apparatus.

An expansion unit as still another exemplified embodiment of the present invention comprises a housing that can be inserted into an expansion bay slot in an electronic apparatus in a detachable manner, a connector that is provided on the housing and electrically connectible with the electronic apparatus, and a USB terminal connectible with an external device. This may provide an expansion unit that facilitates an expansion of USB connector to the electronic apparatus.

An expansion unit as another exemplified embodiment of the present invention comprises a housing that can be inserted into an expansion bay slot in an electronic apparatus in a detachable manner, an image pickup device that is provided in the housing, and a connector that is provided on the housing and electrically connectible with the electronic apparatus. This may provide an expansion unit that can add an image pickup function to the electronic apparatus. The expansion unit may further comprise a mechanism that is connected with the housing and allows the image pickup device to project from the housing (e.g., pop-up mechanism). This mechanism facilitates user operations. The image pickup device may be detachably provided in the housing. The expansion unit may also comprise a mounting mechanism for the image pickup device that has been detached. The expansion unit may further comprise a cable that connects the image pickup device and the housing to each other. This may ensure a wide image-shooting range of the image pickup device. The housing may further comprise a storage portion for the cable. This may ensure the image-shooting range of the image pickup device as far as the cable extends.

An expansion unit as another exemplified embodiment of the present invention comprises a housing that can be inserted into an expansion bay slot in an electronic apparatus in a detachable manner, an image pickup device that is stored in the housing, and a mechanism that is connected with the housing and allows the image pickup device to project from the housing (e.g., pop-up mechanism). This may provide an expansion unit that can add an image pickup function to the electronic apparatus. This mechanism facilitates user operations. The expansion unit may further comprise an angular adjustment mechanism for adjusting an angle of the image pickup device that has projected from the housing, with respect to the housing. This can ensure a wide image-shooting range of the image pickup device.

An expansion unit as another exemplified embodiment of the present invention comprises a housing that can be inserted into an expansion bay slot in an electronic apparatus and includes a plurality of card slots which can receive a plurality of cards, and a connector that is provided on the housing and electrically connectible with the electronic apparatus. The expansion unit may expand functions of the card for the electronic apparatus. This expansion unit may particularly have greatly extended functionality as the expansion unit can receive a plurality of cards.

An expansion unit as another exemplified embodiment of the present invention comprises a housing that can be inserted into an expansion bay slot in an electronic apparatus and includes a plurality of card slots which are arranged side by side and can receive plural types of cards each having a different height, and a connector that is provided on the housing and electrically connectible with the electronic apparatus. The expansion unit may expand functions of the card for the electronic apparatus. Particularly, this expansion unit does not prevent the electronic apparatus from being designed to be thin, as a plurality of cards in a different height arranged side by side in the expansion unit.

An expansion unit as another exemplified embodiment of the present invention comprises a housing that can be inserted into an expansion bay slot in an electronic apparatus in a detachable manner, and a holder provided in the housing for a communication device (e.g., cellular phone). This expansion unit may provide a convenient cellular phone holder for a user who uses the electronic apparatus and the cellular phone at the same time. The expansion unit may further comprise a connector that is provided on said housing and electrically connectible with said electronic apparatus. In that event, the housing may include a unit having the same function as, or different function from, the communication device. The holder may be stored in the housing and allowed to project from the housing. The expansion unit may further comprise a connection member enabling a connection between the communication device and the electronic apparatus. This expansion unit may expand a communication function for the electronic apparatus. For example, data created in the electronic apparatus can be transmitted through a cellular phone, and data can be received through the cellular phone.

An expansion unit as another exemplified embodiment of the present invention comprises a housing which can be inserted into an expansion bay slot in an electronic apparatus, a card reader, image-forming device image-input device, AC adapter, position detecting information receiver, bar code reader and/or infrared communication device provided in the housing, and a connector which is provided on the housing and electrically connectible with the electronic apparatus. This expansion unit may expand diverse functions for the electronic apparatus.

The before mentioned AC adapter means or includes a converter converting a commercial power supply to a power supply driving the electronic apparatus, a converter converting an external power supply to a power supply driving the electronic apparatus, a converter converting an alternating current power supply to a direct current power supply or the like.

An electronic apparatus as an exemplified embodiment of the present invention comprises a housing including an expansion bay slot into which an expansion unit can be inserted in a detachable manner, the expansion bay slot opening at a bottom of the housing to allow the expansion unit to partially project from the bottom of the housing, and a connector which is provided in the housing and electrically connectible with the expansion unit. Such an electronic apparatus, as permitting partial projection of the expansion unit, does not need to have a large body for receiving the entire body of the expansion unit, therefore contributing to realizing enhanced multiple functions of the electronic apparatus while keeping the apparatus compact, lightweight, and low-profile.

An electronic apparatus as another exemplified embodiment of the present invention comprises a first part having a slot, a second part which can be inserted into the slot on the first part in a detachable manner, and an interface device which electrically connects the first and second parts to each other, wherein the second part partially projects from a bottom of the electronic apparatus when inserted into the slot on the first part and electrically connected with the first part through the interface device. Such an electronic apparatus has the same effect as the above electronic apparatus.

An electronic apparatus as still another exemplified embodiment of the present invention comprises a first part having a slot, a second part which can be inserted into the slot on the first part in a detachable manner, and an interface device which electrically connects the first and second parts, wherein the second part is partially projected from the electronic apparatus when inserted into the slot on the first part and electrically connected with the first part through the interface device. Such an electronic apparatus has the same effect as the above electronic apparatus and/or expansion unit.

An electronic apparatus as still another exemplified embodiment of the present invention comprises a housing including an expansion bay slot into which an expansion unit can be inserted in a detachable manner, and a USB interface which is provided in the housing and can establish a USB connection with the expansion unit. This may provide an electronic apparatus compatible with the expansion unit having an USB interface.

An electronic apparatus as another exemplified embodiment of the present invention comprises a first part having a slot, a second part which is inserted into the slot on the first part in a detachable manner, and an image pickup device which has an interface device electrically connecting the first and second parts and is stored in the second part, and a mechanism which is connected with the second part and allows the image pickup device to project from the second part (e.g., pop-up mechanism). The electronic apparatus may further comprise an angular adjustment mechanism for adjusting an angle of the image pickup device that has projected from the second part, with respect to the second part. Such an electronic apparatus has the same effect as the above expansion unit.

An electronic apparatus as another exemplified embodiment of the present invention comprises a housing, an image pickup device which is stored in the housing so as to project from the housing, and an angular adjustment mechanism for adjusting an angle of the image pickup device that has projected from the housing, with respect to the housing while maintaining an electric connection between the image pickup device and the housing. Such an electronic apparatus has the same effect as the above expansion unit.

An electronic apparatus as another exemplified embodiment of the present invention comprises a housing including an expansion bay slot into which an expansion unit can be inserted in a detachable manner, the expansion bay slot having an opening at a bottom of the housing to allow the expansion unit to be partially projected from the bottom of the housing, a first connector which is provided in the housing and electrically connectible with a first expansion unit, and a second connector which is provided in the housing and electrically connectible with a second expansion unit. Such an electronic apparatus can retain its compact, lightweight, and low-profile body by allowing a partial projection of the expansion unit, and the connector with the expansion unit is divided into two to allocate the first and second connector in accordance with the kind of signal, frequency of use, and others, whereby efficient function expansion can be achieved. The above expansion bay slot may be shared by the first and second expansion unit, which allows the electronic apparatus to dispense with individual slot for each expansion unit, and thereby to retain its compact, lightweight, and low-profile body. The first connector may have an interface that can transmit a file signal including data and programs that the electronic apparatus can handle. The second connector may have an interface that can transmit a CardBus signal for a card and/or a USB interface that can transmit a USB signal. Accordingly, by allocating the first and second connectors in accordance with the kind of signal, efficient function expansion can be achieved, and the first and second expansion units can be loaded at the same time.

Other objects and further features of the present invention will become readily apparent from the following description of the embodiments with reference to accompanying drawings.

DETAILED DESCRIPTION OF THE INVENTION

Figure 1:
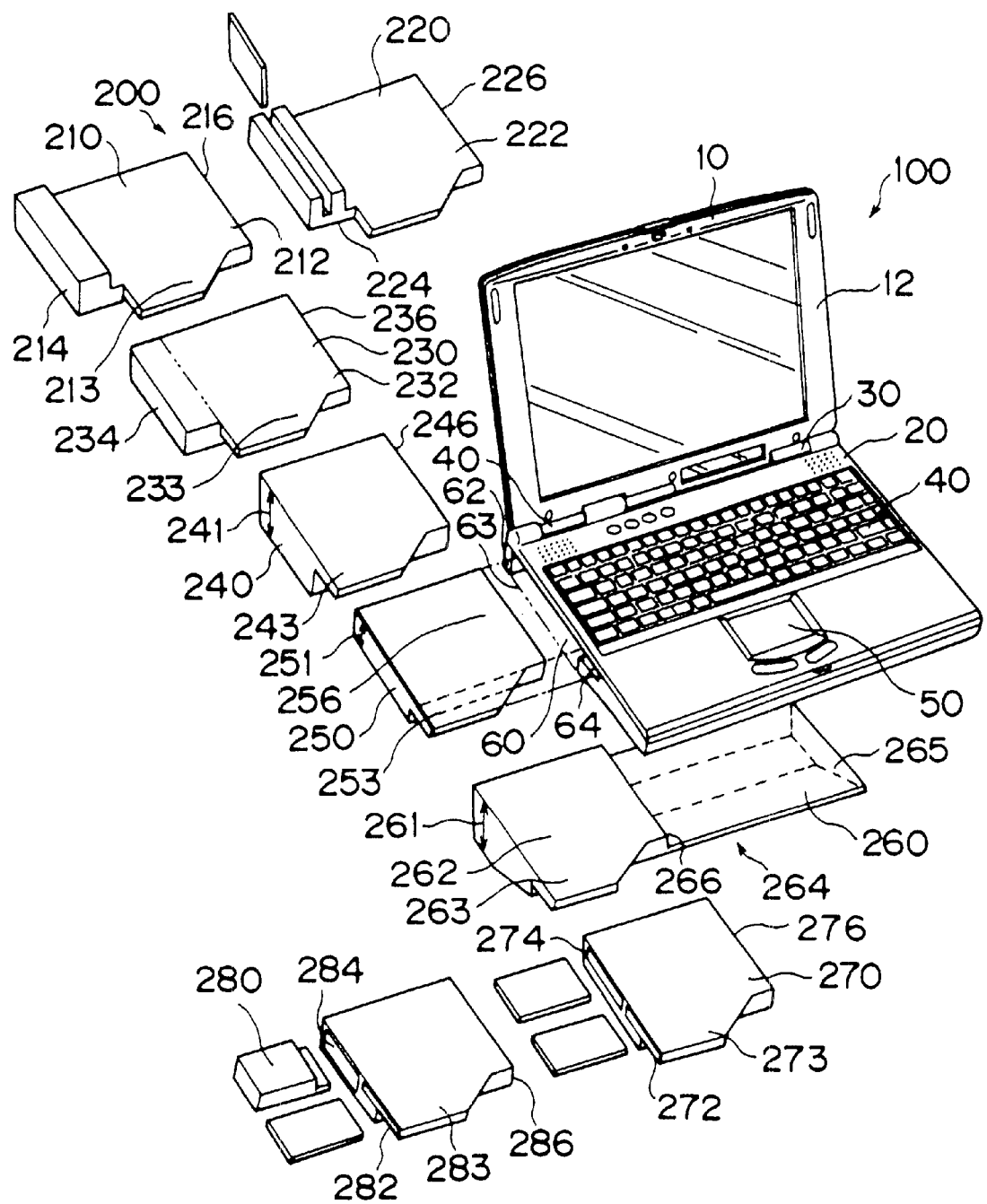
FIG. 1 is a schematic perspective view of a notebook PC as an example of an exemplified electronic apparatus and an expansion unit of the present invention.

A description will now be given of an electronic apparatus 100 and an expansion unit 200 with reference to accompanying drawings. The same members are designated by the same reference numerals, and a duplicate description thereof will be omitted. Hereupon, FIG. 1 is a schematic perspective view of the electronic apparatus 100 and the expansion unit 200. The expansion unit 200 may not necessarily be configured separate from the electronic apparatus 100 but may constitute a part of the electronic apparatus 100.

Referring to FIG. 1, the electronic apparatus 100 is exemplarily shown as, but not limited to, the notebook PC 100, and includes PDAs, handheld PCs, palm-size PCs, wearable computers, portable electronic apparatuses, and portable terminals. The notebook PC 100 may cover A4, B5, sub-notebook, mini-notebook and other sizes.

The notebook PC 100 includes a liquid crystal display (LCD) bezel frame 10 and a base 20 which are connected to each other via a hinge 30, and an LCD screen is placed on the LCD bezel frame 10. Typically, the base 20 has a thickness of about 50 mm or less, or preferably about 20 to 30 mm. The LCD bezel frame 10 has a substantially rectangular shape so as to hold the LCD screen 12. The base 20 includes a keyboard section 40 for typing information in. The keyboard may use any type including 101, 106, 109 and ergonomics, and any key arrangement including QWERTY, DVORAK, JIS, new-JIS, and NICOLA (Nihongo Nyuryoku Conthotium Layout). The base 20 also includes a pointing device 50 that emulates part of mouse functions. Despite the structure shown in FIG. 1, the pointing device 50 may include a mouse, a trackball, a trackpad, a tablet, a digitizer, a joystick, a joypad, a touch panel, and a stylus pen.

Formed on the base 20 is an expansion bay slot 60 into which an expansion unit 200 of various kinds may be detachably inserted. When viewed from the left side of the notebook PC 100, the expansion bay slot is approximately L-shaped and includes openings 62 and 64. Attached to the notebook PC 100 is a cover (not shown) that may be fitted into the openings 62 and 64 at the left side of the notebook PC 100, and a removal of the cover to expose the openings 62 and 64 may allow the expansion unit 200 to be inserted into these openings. The cover may be attached via a spring or hinge structure at the left side or other portions of the notebook PC 100.

A shape of the expansion bay slot 60 is, needless to say, not limited to L. The opening 64 is the space necessary to receive part of the expansion unit 200 which stores a CD-ROM and other disk-form media or the like, but the space does not extend to the bottom of the notebook PC 100 for space saving and miniaturization purposes. The space below the opening 64 serves to partially store another component (e.g., a battery unit) of the notebook PC 100.

It goes without saying that the size, shape and width of the expansion bay slot 60 may vary with a design of the expansion unit 200. They may also vary with a shape of the electronic apparatus 100, as may be the case with the inventive electronic apparatus 100 embodied in a PDA. The notebook PC 100 may be compatible with all or some of a variety of the expansion units 200 shown in FIG. 1, or other type of expansion unit 200.

As will be described later, the expansion unit 200 may be completely stored in the expansion bay slot 60, or part of the expansion unit 200 may project from the side, bottom or other surface of the base 20 of the notebook PC 100. This structure which allows such a partial projection of the expansion unit 200 does not require the notebook PC 100 to be large enough to completely store all the types of the expansion units 200, thus making the notebook PC 100 multifunctional while keeping it compact, lightweight and thin.

The present embodiment refers to the portion 60 as the expansion bay slot in the notebook PC 100 into which the expansion unit shown in FIG. 1 may be inserted. The term expansion bay slot conveys the same sense as the bay described in the "background of the invention" section. The term expansion bay slot covers what is called an expansion bay, a multi-purpose bay and the like.

In order to allow part of the expansion unit 200 to project from the bottom surface of the base 20, the opening 62 has an opening 63 at the bottom of the base 20 in FIG. 1. The opening 63 allows not only the thick-type expansion unit 240 to be inserted, but also the inserted expansion unit to serve as a tilt stand. A further explanation of this configuration will be given later together with an expansion unit 260. A cover (not shown) that fits the opening 63 may be provided; when the cover removed and the openings 62 and 64 are exposed, the thick expansion units 240 and 260 may become inserted. Such a cover may be attached via a spring or hinge structure at the bottom of the base 20. Naturally, the opening 63 is optional and may be removed from the bottom of the base 20 in the notebook PC 100 which does not use the thick expansion units 240 and 260.

FIG. 1 illustrates a plurality of expansion units 200 having a variety of housing shapes. The expansion units 200 in FIG. 1 include projection-type expansion units 210 through 230, thick expansion unit 240, thin expansion unit 250, tilt stand expansion unit 260, and PC-card expansion units 270 and 280. The electronic apparatus 100 needs not use all of these expansion units 210 through 280, but may optionally use some of them or other types of expansion units in addition to all or some of them.

The projection-type expansion units 210 through 230 are those which partially project from the left side of the notebook PC 100. The expansion unit 210 includes a base portion 212 storable in the expansion bay slot 60, and a projection 214 having an approximately L-shaped section. The projection 214 serves, for example, as a position detecting information receiver. The projection 214 is not limited to the position detecting information receiver, but may be any receiver for a variety of radio waves (e.g., medium frequency, high frequency, very high frequency). The expansion unit 220 includes a base portion 222 storable in the expansion bay slot 60, and a projection 224 having an approximately concave section. The projection 224 may serve, for instance, as a card reader. A usable card may not be limited to a magnetic card such as a credit card, but be a contact or noncontact IC card, a memory card, and an expansion card. The card reader may thus be a reader/writer that communicates with the IC card through electronic money. The expansion unit 230 includes a base portion 232 storable in the expansion bay slot 60, and a projection 234 having an approximately rectangular section. The projections 214 and 234 differ from each other in height. The expansion unit 230 may serve, for instance, as a cellular phone holder that will be described later. The base portions of these projection-type expansion units 210 through 230 may be thick (enough to project from the bottom of the base 20) or thin (insufficient to project from the bottom of the base 20). The expansion units 240 through 280 that will be described later may each include a projection as shaped like the projection 214, 224 or 234, or other forms.

The thick expansion unit 240 is a unit that partially projects from the bottom of the base 20, and has a thickness 241 exceeding a height of the opening 62. The thick expansion unit 240 may be embodied, for instance, as an AC adapter. The expansion unit including the AC adapter will be understood through a detailed description as will be given later. The thin expansion unit 250 is a unit that does not project from the bottom of the base 20, and has a thickness 251 less than the height of the height of the opening 62. The thin expansion unit 250 may be embodied, for instance, as a hard disk drive unit.

The tilt stand expansion unit 260 includes a base portion 262 storable in the expansion bay slot 60, and a support 265 in contact with the bottom of the base 20. The base portion 262 has a thickness 261 greater than the height of the opening 62, as the thick expansion unit 240 does. The tilt stand expansion unit 260 further includes a tilt stand portion 264 that projects from the bottom of the base 20 and supports the base 20. The tilt stand portion 264 serves to slightly tilt down the base 20 toward a user when the notebook PC 100 is placed on a desk. This tilt ergonomically facilitates user operations using keyboard 40 and others. This projection from the base 20 in the expansion unit 200 has a given function and thus differs from that of the PC card as shown in a prior art reference (e.g., Japanese Laid-Open Patent Application No. 11-31025) which has a limited shape and little or no function.

The PC-card expansion units 270 and 280 include PC card slots compatible with PC cards of Types I through III, and may be selectively compatible with PC card of Thick Type (having a thickness of 18.0 mm).

Characteristically, the PC-card expansion units 270 and 280 are compatible with a plurality of PC cards. The "plurality of PC cards" may refer to the same or different Types. In the present embodiment, the expansion unit 270 includes a PC card slot 272 for Type I or II, and a PC card slot 274 for Type I or II. The expansion unit 280 includes a PC card slot 282 for Type I or II, and a PC card slot 284 for Type I, II or III. Thus, the PC card expansion units 270 and 280 of the present embodiment may realize more functions than the prior art (e.g., Japanese Laid-Open Patent Application No. 6-75661).

The PC card slots 272 and 274, or 282 and 284 are respectively arranged side by side. The PC card slots 282 and 284 have different mount heights. The PC card slots that are not arranged in a height direction contribute to the reduced thickness of the notebook PC 100. The different mount heights also contribute to the reduced thickness of the notebook PC 100.

It is understood that the expansion units 210 through 280 may be inserted into the expansion bay slot 60 so that their projections 213, 223, 233, 243, 253, 263, 273 and 283 may fit the opening 64.

The expansion units 210 through 280 each include connectors 216, 226. 236. 246, 256, 266, 276 and 286 for connection with the notebook PC 100. These connectors use various interfaces corresponding to devices housed in each expansion unit. These interfaces exemplarily include, but are not limited to, a parallel interface (e.g., IEEE1284 and IEEE1394), a serial interface (e.g., RS-232C and RS-422). IDE (including Enhanced IDE and the like), SCSI (including SCSI-2, SCSI-3), Ultra ATA, USB. ATAPI, 10BASE-2, 10BASE-T, 100BASE-TX, MIDI, ZV port, CardBus, and IrDA. The notebook PC 100 also includes a connector 70 that may be mated with these connectors (see FIG. 2 that will be described later). It is preferable that as soon as the notebook PC 100 is connected to the expansion unit 200 a plug and play or hot plug updates the system.

The devices that can be packed in the expansion unit 200 include, but are not limited to, an information-recording device (e.g.. an FDD, a CD-ROM, a DVD, an LS 120 and an HDD), an external battery, an AC adapter, a USB connector, a PC card, a communication device (e.g., a wireless communication device, an infrared communication device, and other communication devices), a printing device (e.g., printer and the like), an information reader (e.g.. a scanner and an OCR), a security device (e.g., a biometric device using biological information such as a fingerprint recognition device, a voiceprint recognition device, a retina recognition device), a GPS device, a card reader, a bar cord reader, and a cellular phone holder.

Figure 2:
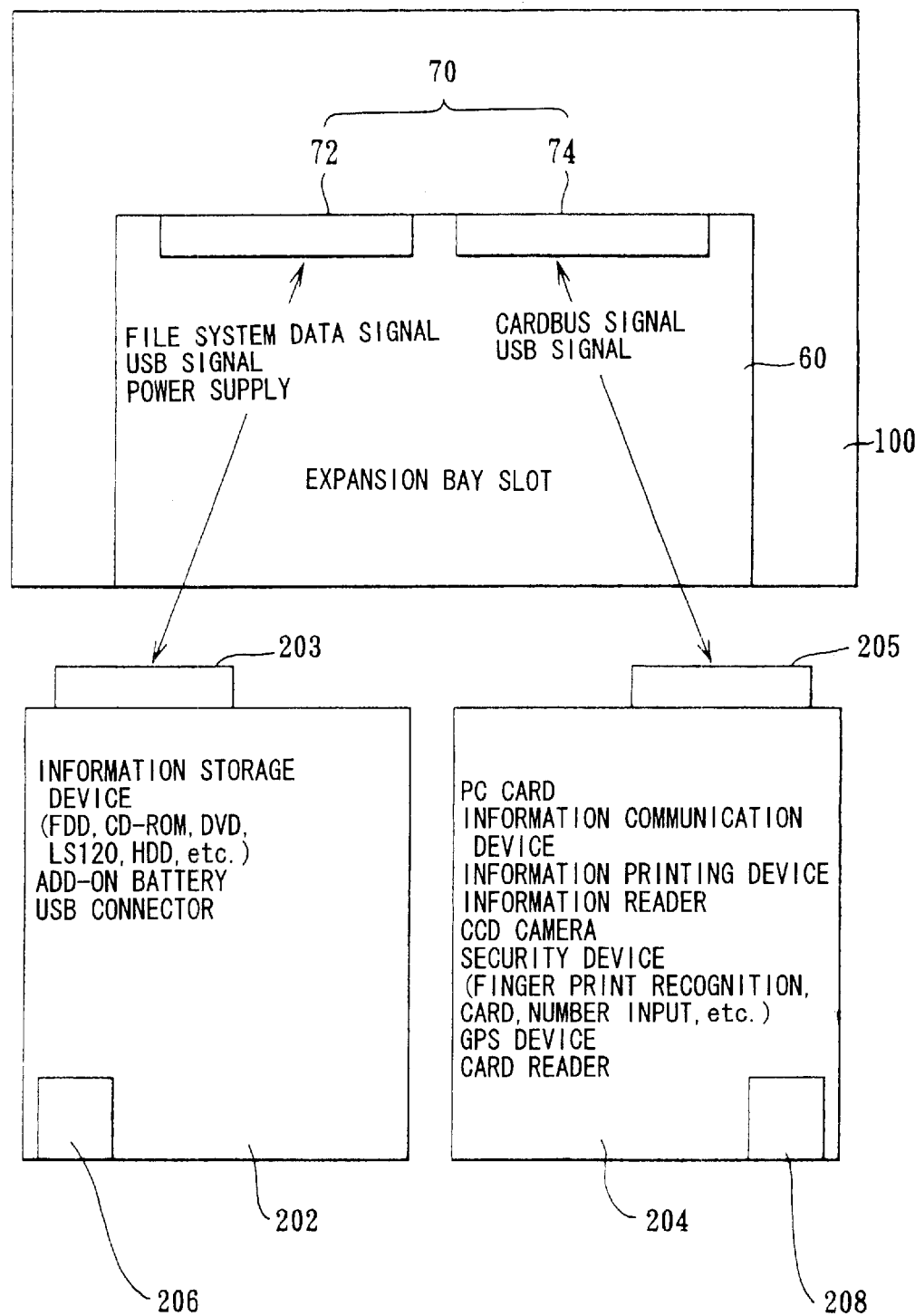
FIG. 2 is a schematic block diagram for illustrating a connection between two kinds of expansion units and the notebook PC shown in FIG. 1 whose connector includes two interfaces.

In order for the notebook PC 100 to become compatible with plural types of expansion units 200, the connector 70 of the notebook PC 100 is effectively designed, preferably divided into interfaces 72 and 74 so as to receive two expansion units simultaneously. Referring now to FIG. 2, a description will be given of this configuration. FIG. 2 is a schematic block diagram for explaining a connection between the expansion units 202 and 204 and the notebook PC 100 whose connector 70 includes two interfaces 72 and 74.

The first interface 72 is configured to transmit to and receive from the connector 203 of the expansion unit 202 file system data signals including those data and programs that the notebook PC 100 can handle,. USB signals, and/or power. The expansion unit 202 connectible with this first interface 72 may contain, for example, an information-recording device (e.g., a FDD, a CD-ROM, a DVD, an LS120 and a HDD), an external battery pack, an AC adapter, and a USB connector. To illustrate, the information-recording device transmits and receives file system data signals, the USB connector transmits and receives USB signals, and the AC adapter supplies power.

The second interface 74 can transmit to and receive from the connector 205 of the expansion unit 204, CardBus signals for PC card, PCI bus signals, or USB signals. The expansion unit 204 connectible with the second interface 74 may contain, for example, a PC card, a communication device (e.g., a wireless communication device, an infrared communication device, and other communication devices), a printing device (e.g., printer and the like), an information reader (e.g., a scanner and an OCR device), a security device (e.g., a biometric device such as a fingerprint recognition device, a voiceprint recognition device, a retina recognition device), a GPS device, a card reader. To illustrate, the PC card transmits and receives CardBus signals, the information reader transmits and receives PCI bus signals, and the CCD camera or security device transmits and receives USB signals.

CardBus is an interface standard for PC card in which a data bus width is extended to 32 bit. PCI bus is also a 32-bit bus, and its standard is established in the PCI SIG (Special Interest Group). A maximum transfer rate of CardBus and PCI bus is 133 Mbps. USB (Universal Serial Bus) is a serial interface for PC peripherals, serves to bring connecting cables together, and supports a plug and play or hot plug. It permits a multiplex connection up to 128 ports, and supports two kinds of transfer rates, 1.5 Mbps for a low-speed mode, and 12 Mbps for a high-speed mode. Four varieties of transfer modes (bulk, control, interrupt, and isochronous modes) are available. The isochronous mode is used for preferentially transferring at intervals data required for a real-time transfer such as a movie and sound. Its signal lines consist of four wires (two communication lines and two power lines). As described above, the USB is suitable for a low- or mid-speed communication interface (ranging from 1.5 Mbps to 12 Mbps), and thus preferably applied to capturing a movie of midrange quality in resolution and display speed (e.g., 320×240 pixels, and 5 or 6 frames/sec.), therefore serving as an inexpensive and standardized communication interface.

These first and second interfaces may be arranged laterally (with the same height or different heights) or longitudinally in the expansion bay slot 60. Thus, both expansion units connectible to the first and second interfaces may be connected simultaneously in a lateral or longitudinal arrangement with the notebook PC 100. The division of the connector of the notebook PC 100 into two connectors may consequently prevent the connector of the expansion unit 200 from having increased number of connection lines and from being destroyed by increased force applied when plugged and unplugged.

Figure 15:
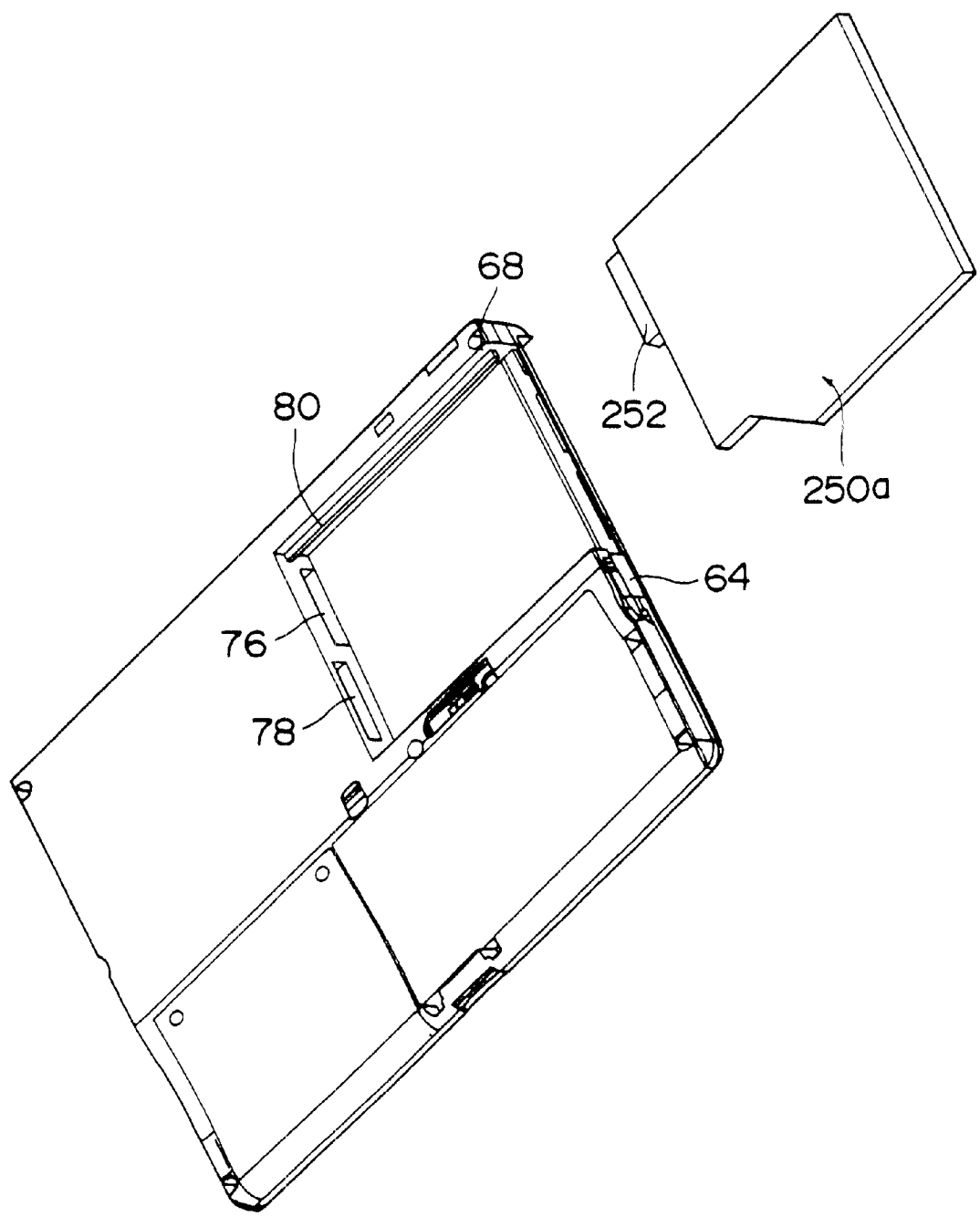
FIG. 15 is a schematic perspective view from a bottom of the notebook PC shown in FIG. 1 including two interfaces, and a thin expansion unit.
Figure 16:
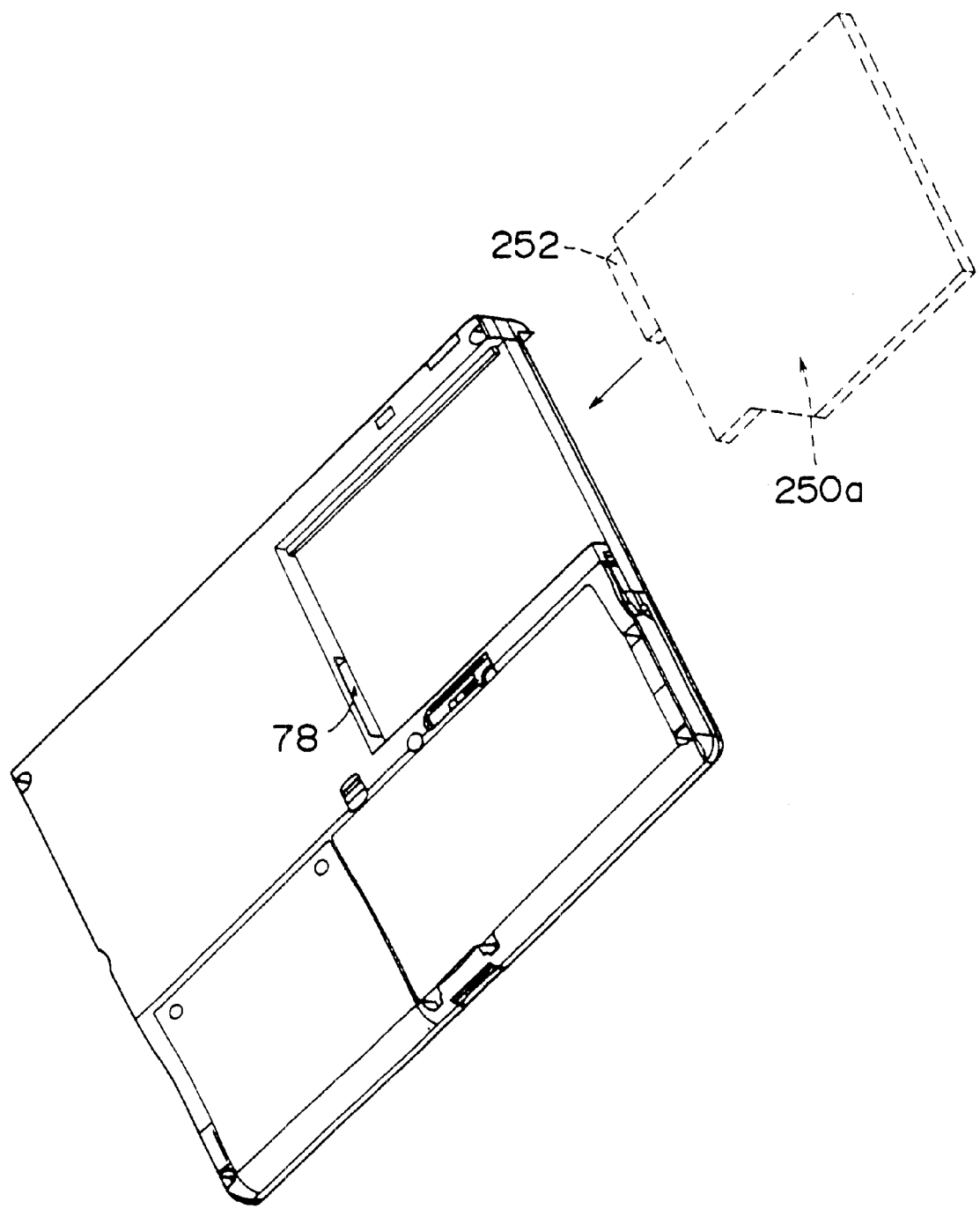
FIG. 16 is a schematic perspective view from a bottom of the notebook PC shown in FIG. 15, and a thin expansion unit inserted in the notebook PC.
Figure 17:
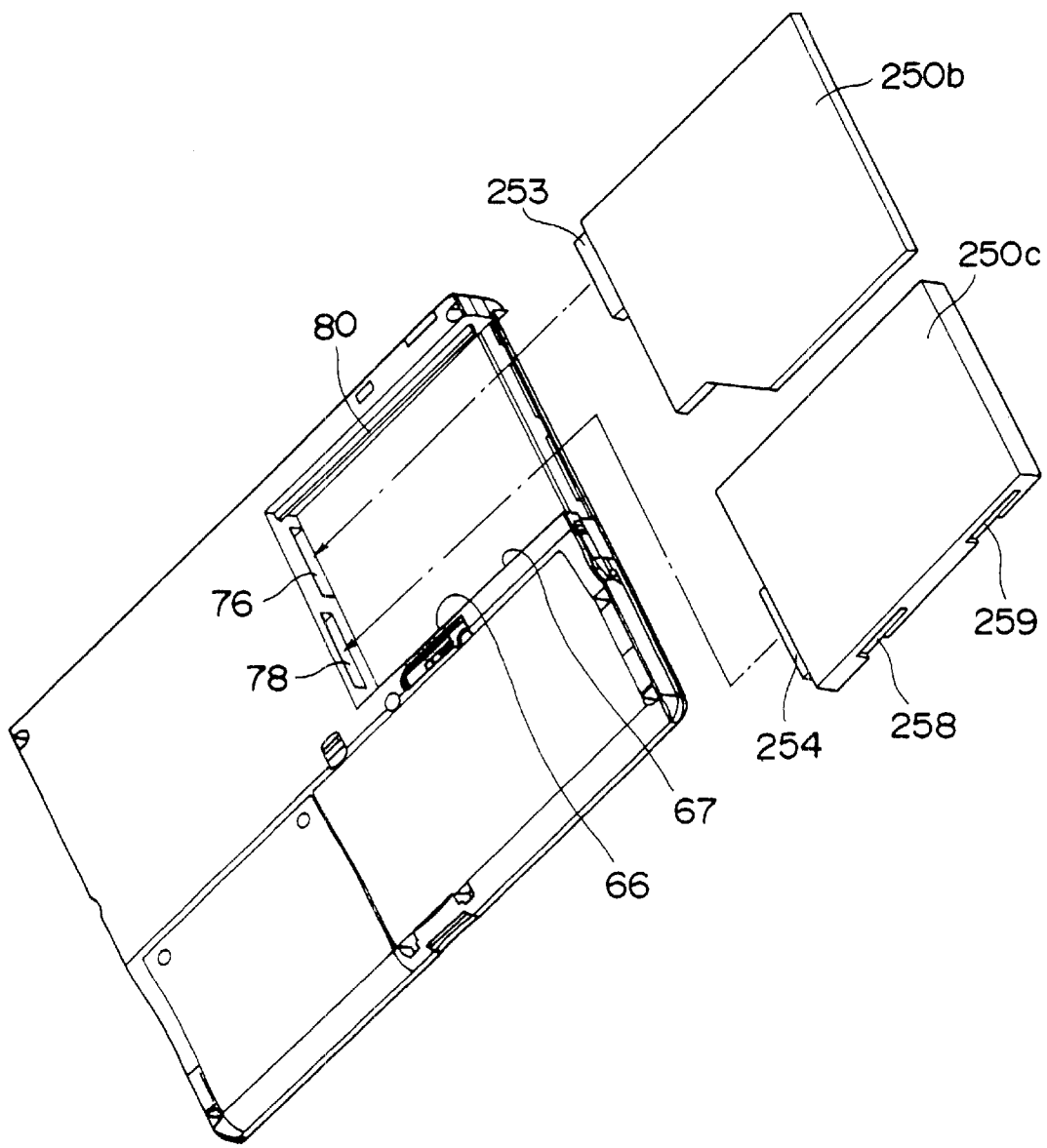
FIG. 17 is a schematic perspective view from a bottom of the notebook PC shown in FIG. 15, a thin expansion unit, and an expansion unit for parallel arrangement.
Figure 18:
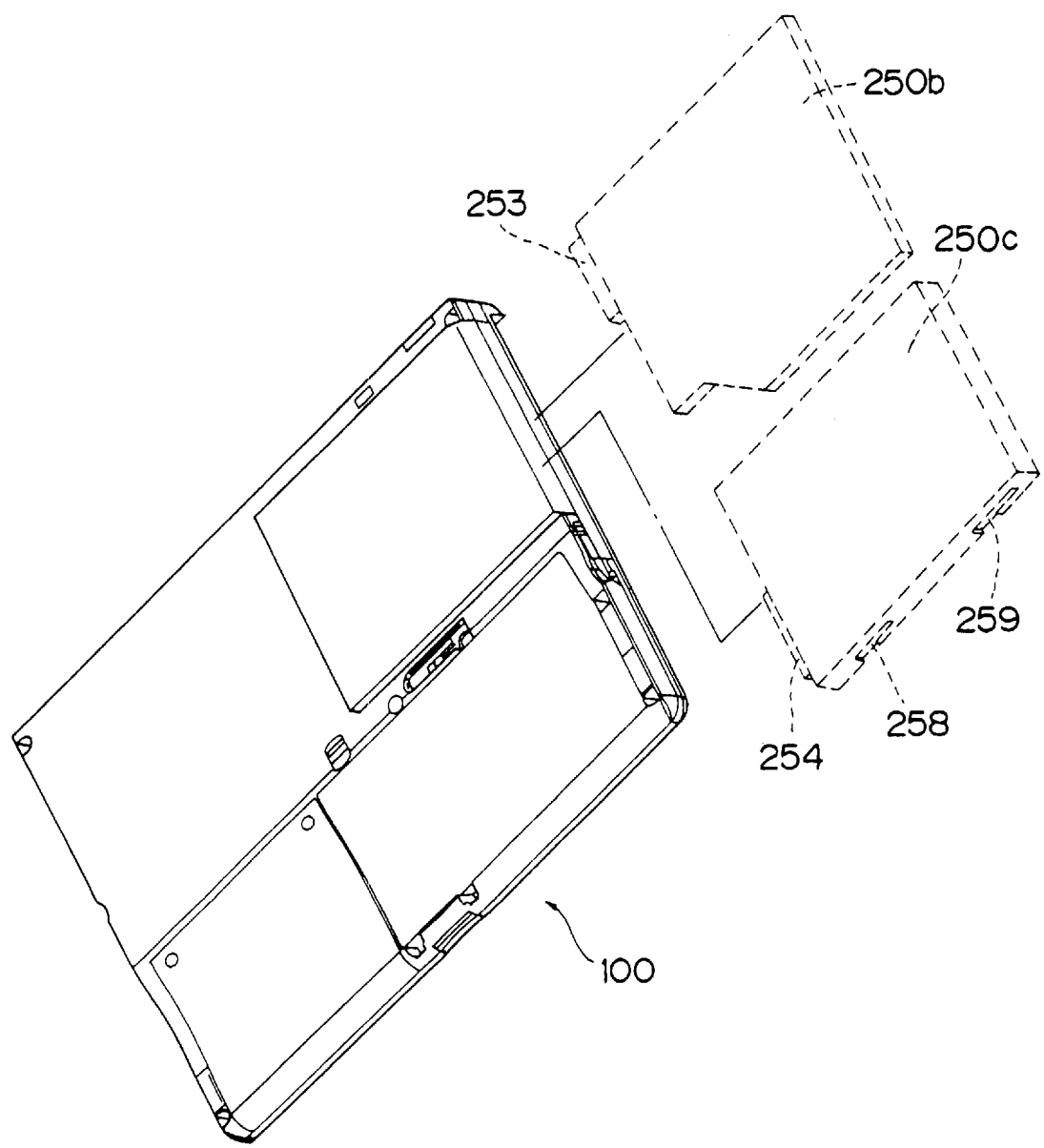
FIG. 18 is a schematic perspective view from a bottom of the notebook PC shown in FIG. 15, and two expansion units inserted in the notebook PC.
Figure 19:
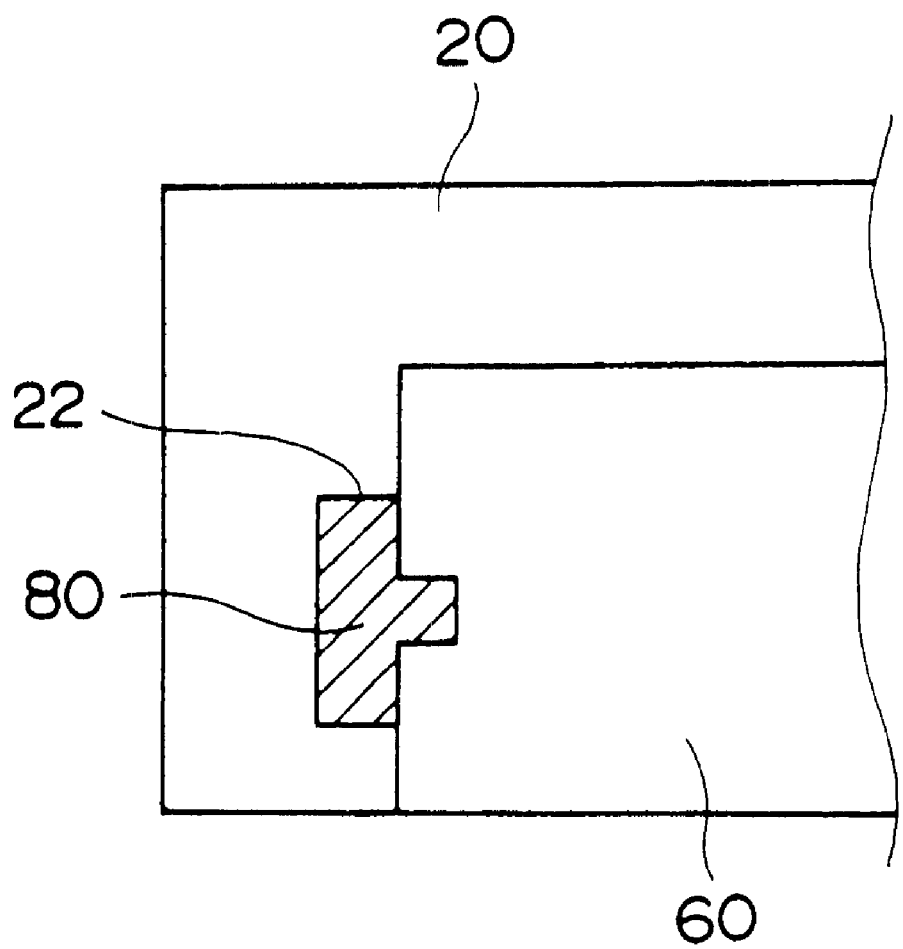
FIG. 19 is a schematic side section around a guide rail within a bay slot of the notebook PC shown in FIG. 15.
Figure 20:
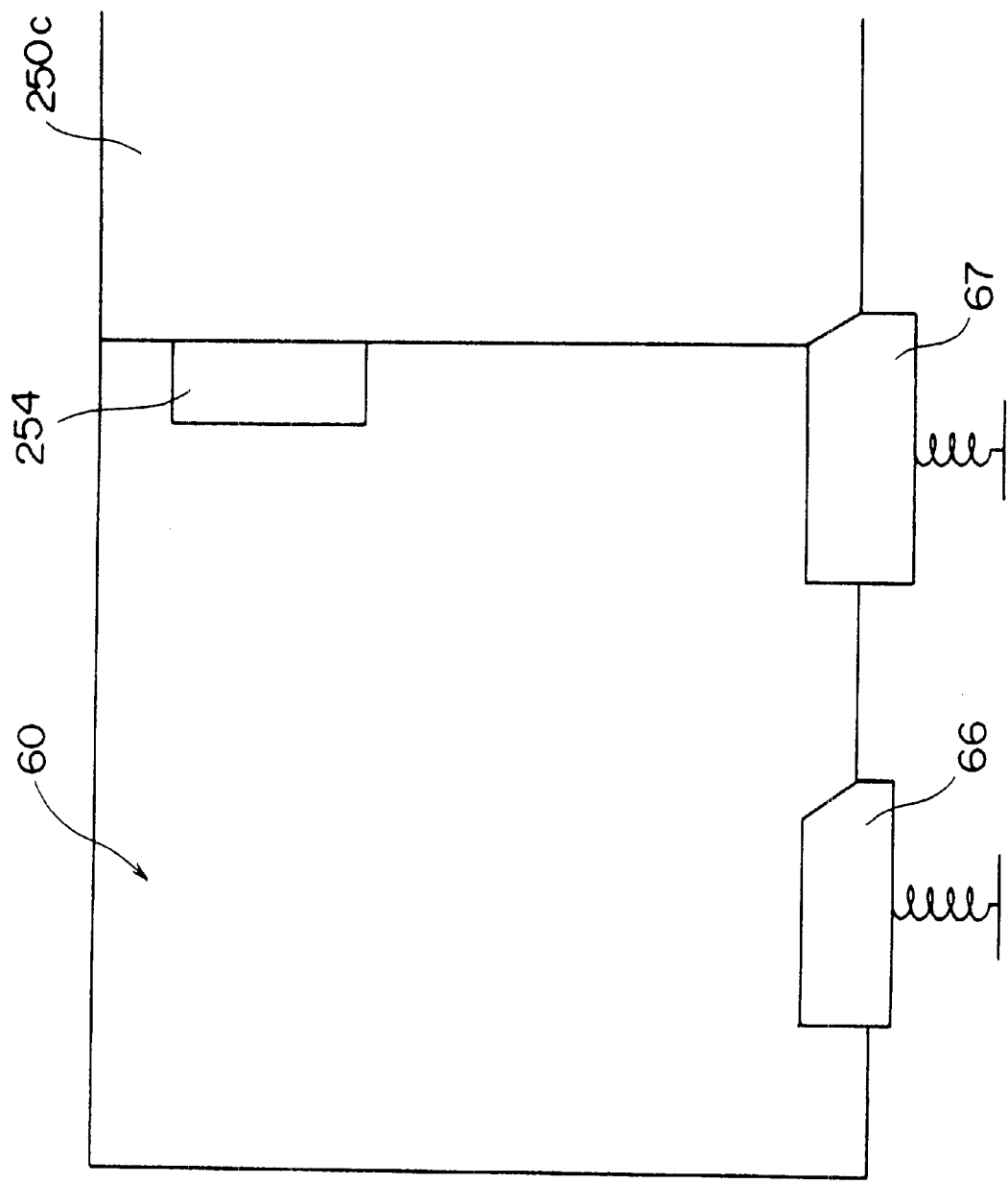
FIG. 20 is a schematic plan section around a projection within a bay slot of the notebook PC shown in FIG. 15.

A description will now be given of the expansion unit that is inserted laterally, with reference to FIGS. 15 through 20. Hereupon, FIG. 15 is a schematic perspective view from a bottom of the notebook PC 100 as shown in FIG. 1 including two interfaces 76 and 78, and a thin expansion unit 250a. FIG. 16 is a schematic perspective view from a bottom of the notebook PC 100 as shown in FIG. 15, and the thin expansion unit 250*a* inserted in the notebook PC 100. FIG. 17 is a schematic perspective view from a bottom of the notebook PC 100 as shown in FIG. 15, a thin expansion unit 250*b*, and an expansion unit 250*c* for lateral arrangement. FIG. 18 is a schematic perspective view from a bottom of the notebook PC 100 as shown in FIG. 15, and two expansion units 250*b* and 250*c* inserted in the notebook PC 100. FIG. 19 is a schematic perspective view around a guide rail 80 within a bay slot 60 in the notebook PC 100 as shown in FIG. 15. FIG. 20 is a schematic plan section around projections 66 and 67 within a bay slot 60 in the notebook PC 100.

The notebook PC 100 includes a first interface 76, a second interface 78, and a guide rail 80. Assume that an insertion space in the first interface 76 into which the expansion unit is inserted is defined as a first space. Similarly, an insertion space in the second interface 80 into which the expansion unit is inserted is defined as a second space. In a description of lateral arrangement of two expansion units, a thick expansion unit is such an expansion unit as is thicker than the first space.

The thin expansion units 250*a* and 250*b* include a base portion, a projection, and connectors 252 and 253, and are inserted into the first space. The thin expansion units 250*a* and 250*b* are sandwiched between the opening 64 and the guide rail 80, and are inserted into the first space. The connectors 252 and 253 are connected to the first interface 76, and establish electric connection between the thin expansion units 250*a* and 250*b*, and the notebook PC 100.

The expansion unit 250*c* for lateral arrangement includes a base portion, L-shaped grooves 258 and 259, and a connector 254, and is inserted into the second space. The expansion unit 250*c* for lateral arrangement is fixed in the bay slot 60 by engaging the L-shaped grooves 258 and 259 with the projections 66 and 67. The connector 254 is connected to the second interface 78, and establishes electric connection between the expansion unit 250*c* for lateral arrangement and the notebook PC 100. Types of unit usable as the expansion unit 250*c* for lateral arrangement inserted into the second space are not limited by thickness. The thick expansion unit inserted into the second space projects from a bottom of the notebook PC 100, at which an opening is provided. The expansion unit 250*c* is fixed in the second space in such a manner as described above, but may be fixed otherwise. For example, it is conceivable that a bottom cover is provided for the notebook PC 100, if the expansion unit 250*c* for lateral arrangement is such as does not project from the bottom. The expansion unit 250*c* for lateral arrangement is sandwiched and fixed between the bottom cover and the guide rail 80.

As exemplified in FIG. 19, the guide rail 80 may be shaped like a letter T. The guide rail 80 is formed as a groove at a side 68 of a bay slot to be inserted in a detachable/attachable manner. The guide rail 80 may be detached from the notebook PC 100, so that the notebook PC 100 can accommodate a thick expansion unit.

Similarly, the projections 66 and 67 may be configured as will be described below so that the thick expansion unit 250 can be inserted into the bay slot 60. The projections 66 and 67 preferably project from the bay slot 60 by a forcing means such as a spring. As shown in FIG. 20, the projections 66 and 67 get contained within walls of the bay slot 60 associated with an insertion of the thick expansion unit. This is achieved by canting contact portions of the projections 66 and 67 with the expansion unit. The projections 66 and 67 are projected by the forcing means when the thick expansion unit is detached.

The above configurations to the guide rail 80 and the projections 66 and 67 provide the following options: (1) one thin expansion unit inserted alone or along with the other expansion unit that is arranged laterally may be used where the guide rail 80 is attached; (2) one thick expansion unit inserted alone may be used where the guide rail 80 is detached. These options would apparently fertilize expansion functions of one notebook PC.

The guide rail 80 is, if detachably configured, not limited to mechanisms including a groove on a side 81, and a T-shaped guide rail. Moreover, a thick expansion unit may be applied to a notebook PC that includes a guide rail 80 on a side 81, if the thick expansion unit includes a groove corresponding to the guide rail 80.

The expansion units 202 and 204 may preferably include respectively USB connectors 206 and 208 for the USB connection with an external device as shown in FIG. 2. This brings about various effects including an easy addition of USB connectors.

Figure 3:
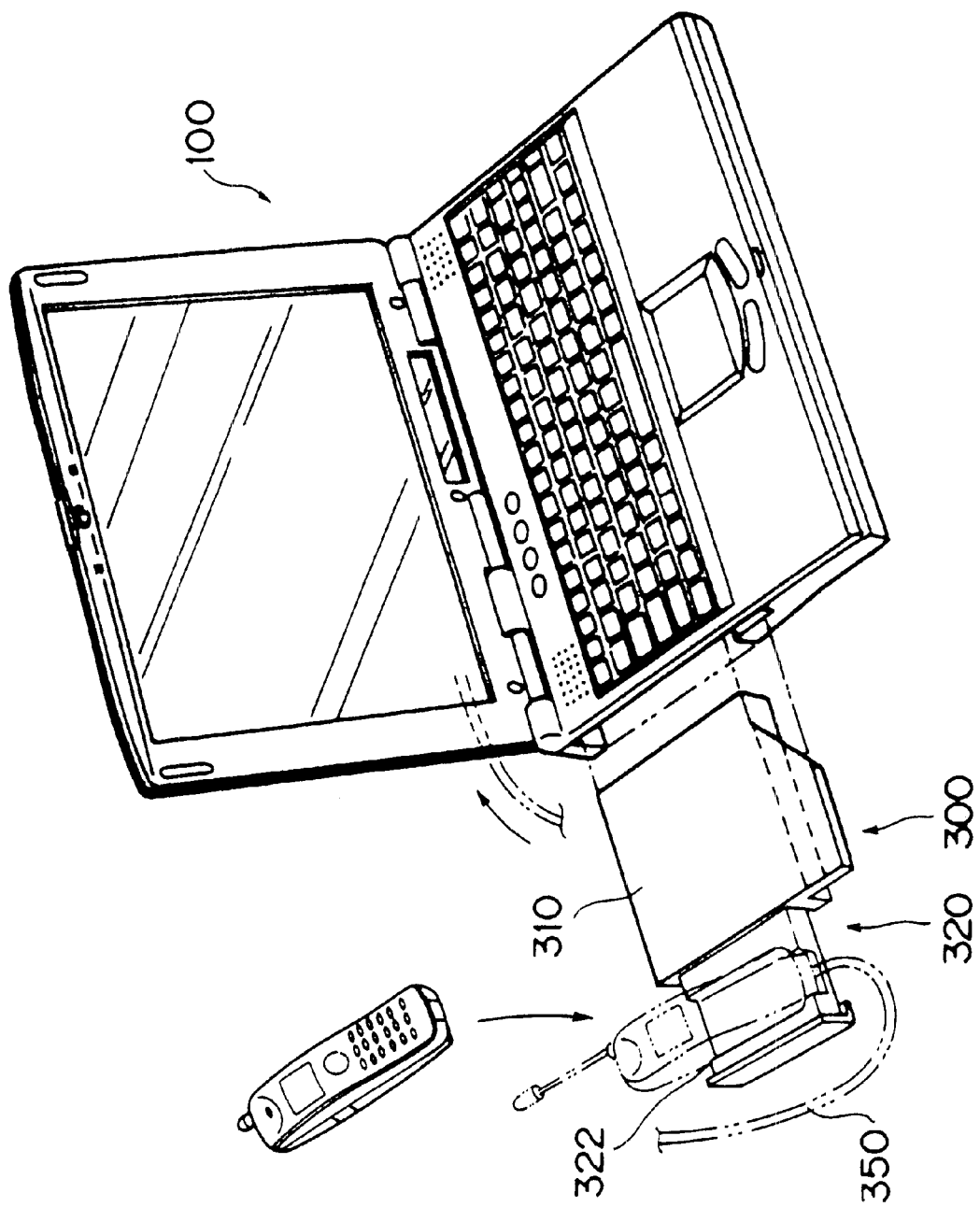
FIG. 3 is a schematic perspective view of the notebook PC shown in FIG. 1 and an expansion unit having a cellular phone holder.

Referring now to FIG. 3, a description will be given of an expansion unit 300 having a cellular phone holder 320. Hereupon, FIG. 3 is a schematic perspective view of the notebook PC 100 and the expansion unit 300 having the cellular phone holder 320.

The expansion unit 300 includes a base portion 310 and a cellular phone holder 320. The base portion 310 may be substituted with any desired expansion unit 200. The cellular phone holder 320 is preferably configured to be separable from the base portion 310, and includes a holder portion 322 holding a cellular phone CP. Since the cellular phone holder 320 does not take part in a connection between the base portion 310 and the notebook PC 100, a type of device stored in the base portion 310 is not limited. The cellular phone CP in the present embodiment is connected via a cord 350 with the notebook PC 100 to allow a user in a car, for instance, to send a document created by the notebook PC 100 by attaching it to e-mail or otherwise via communication modes such as PDC (Personal Digital Cellular), IS-54 and IS-95, GSM (Global System for Mobile communication). The user may place the cellular phone CP on the cellular phone holder 320 during the document preparation, and use a CD-ROM drive for the base portion 310 that may store necessary data for the document preparation.

Figure 4:
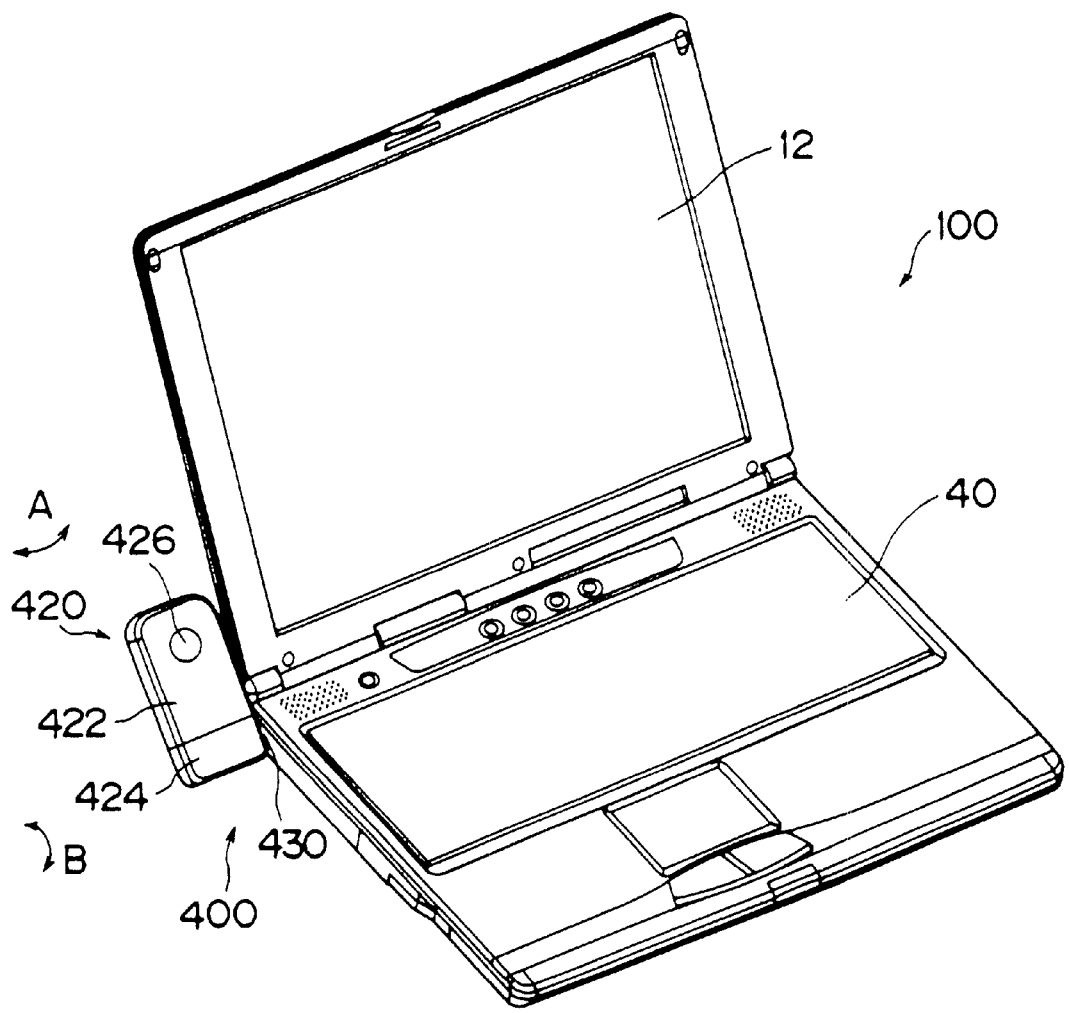
FIG. 4 is a schematic perspective view of an expansion unit having a CCD camera in use that has been inserted into the notebook PC shown in FIG. 1.
Figure 5:
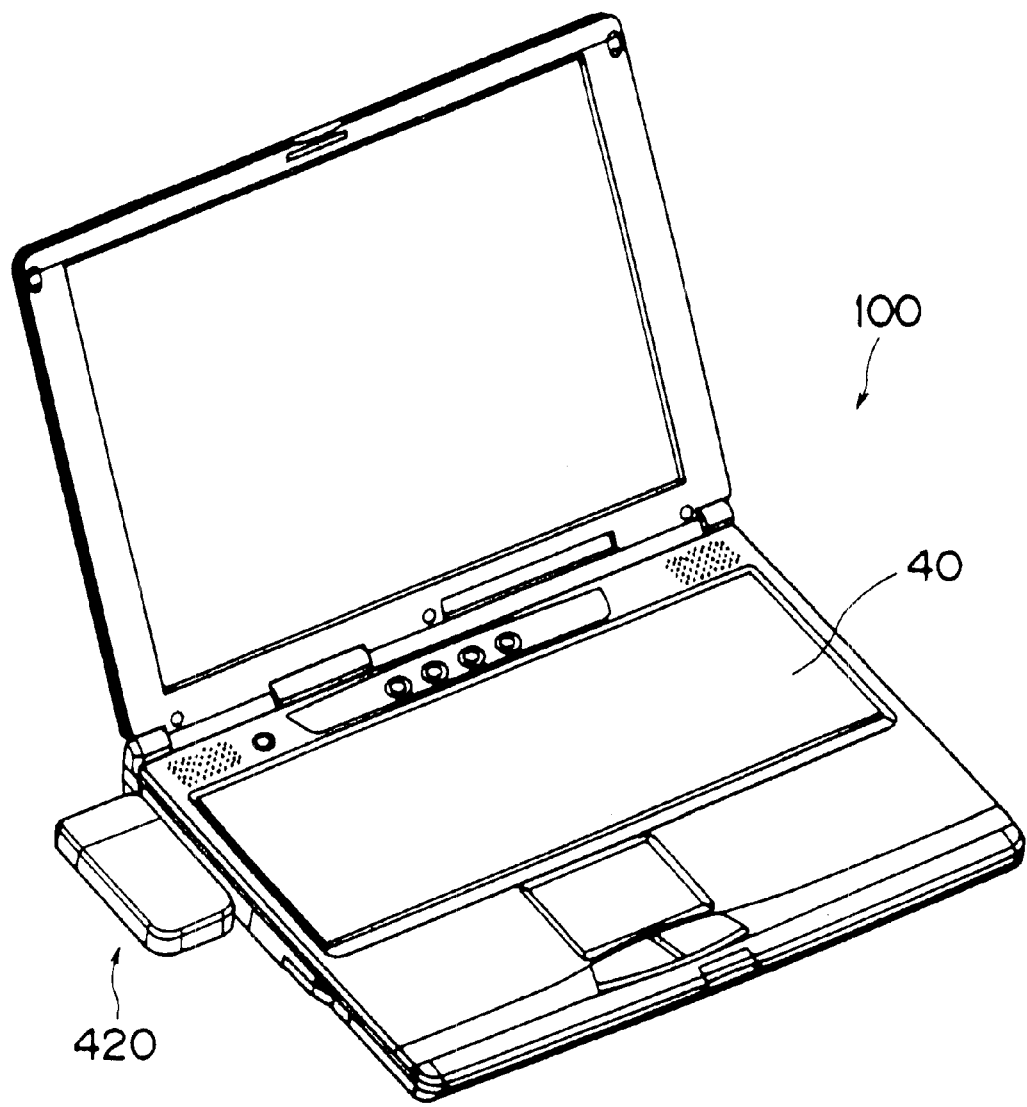
FIG. 5 is a schematic perspective view of the expansion unit shown in FIG. 4 prior to use that has been inserted into the notebook PC shown in FIG. 1.
Figure 6:
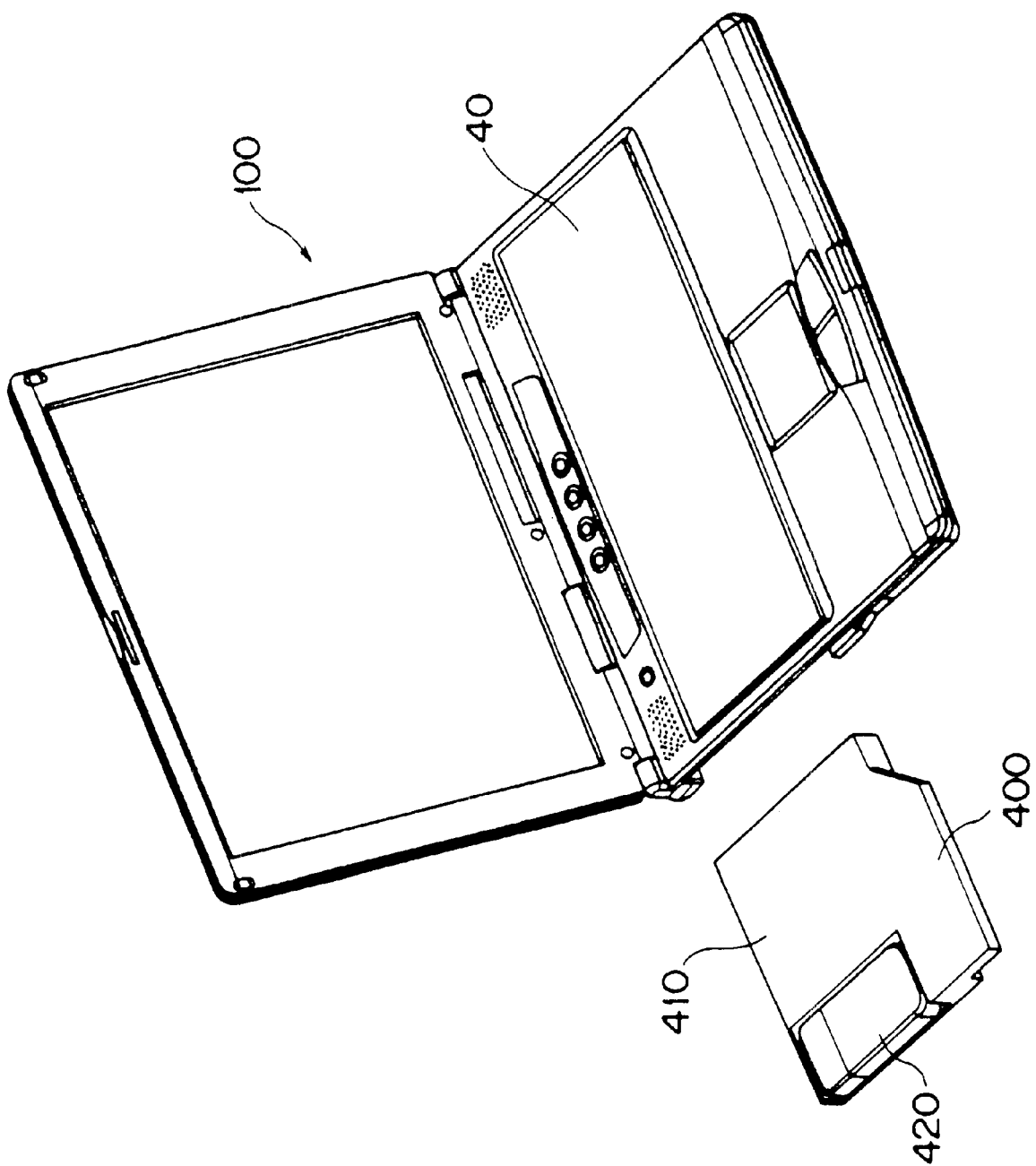
FIG. 6 is a schematic perspective view of the expansion unit with the CCD camera shown in FIG. 4 stored in a base portion before it is inserted into the notebook PC shown in FIG. 1.
Figure 7:
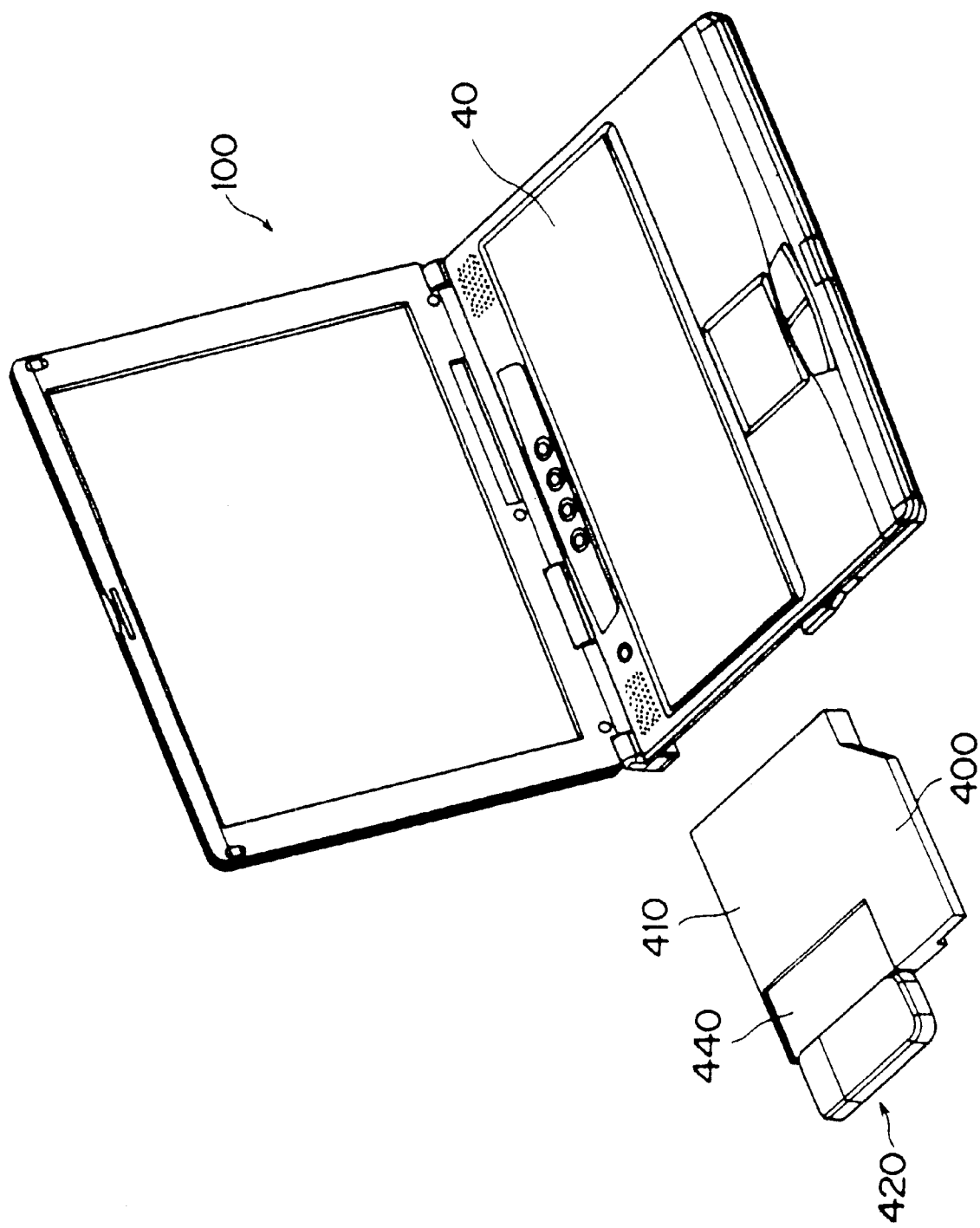
FIG. 7 is a schematic perspective view of the expansion unit with the CCD camera shown in FIG. 4 slid out of the base portion before it is inserted into the notebook PC shown in FIG. 1.
Figure 8:
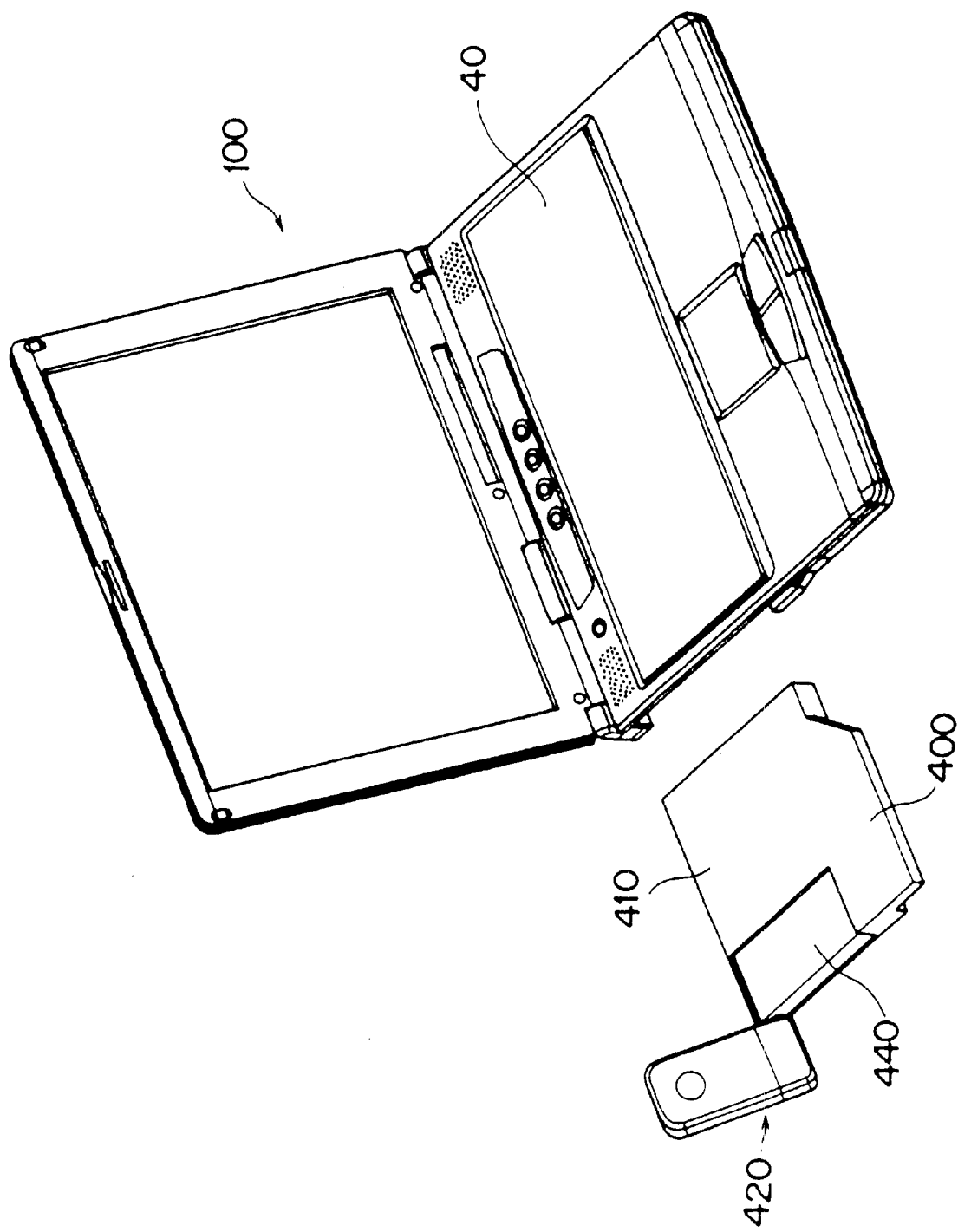
FIG. 8 is a schematic perspective view of the expansion unit with the CCD camera shown in FIG. 4 slid out of the base portion and tilted before it is inserted into the notebook PC shown in FIG. 1.
Figure 9:
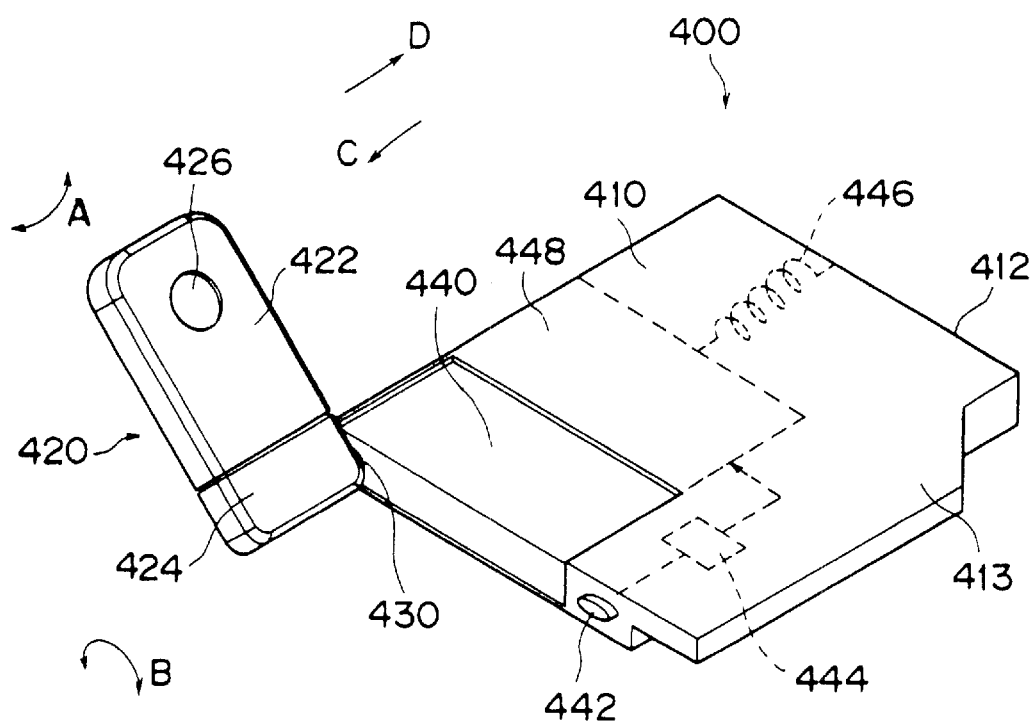
FIG. 9 is a magnified perspective view of the expansion unit with the CCD camera shown in FIG. 4 slid out of the base portion and tilted.

Next, a description will be given of an expansion unit 400 having a CCD camera 420 with reference to FIGS. 4 through 9. FIG. 4 is a schematic perspective view of the expansion unit 400 having the CCD camera 420 in use that has been inserted into the notebook PC shown in FIG. 1. FIG. 5 is a schematic perspective view of the expansion unit 400 prior to use that has been inserted into the notebook PC 100. FIG. 6 is a schematic perspective view of the expansion unit 400 with the CCD camera 420 stored in its base portion 410 before it is inserted into the notebook PC 100. FIG. 7 is a schematic perspective view of the expansion unit 400 with the CCD camera 420 slid out of its base portion 410 before it is inserted into the notebook PC 100. FIG. 8 is a schematic perspective view of the expansion unit 400 with has the CCD camera 420 slid out of its base portion 410 and tilted before it is inserted into the notebook PC 100. FIG. 9 is a magnified perspective view of the expansion unit 400 with the CCD camera 420 slid out of its base portion 410 and tilted.

A portion indicated by numeral 40 in FIGS. 4 through 8 is provided with a keyboard, but a specific illustration of the keyboard is omitted. The keyboard provided in the portion indicated by numeral 40 is the same as that shown in FIG. 1.

The expansion bay slot in the body of the notebook PC 100 shown in FIGS. 4 through 8 does not have an opening at the bottom unlike FIG. 1. The expansion unit 400 in FIGS. 4 through 8 is so designed to have a thickness as to fit the body of the notebook PC 100, and thus does not require any opening at the bottom of the notebook PC 100 unlike FIG. 1. However, when a single notebook PC is required to be compatible with both structures shown in FIG. 1 and in FIGS. 4 through 8, the expansion bay slot in the body of the notebook PC 100 may include an opening at its bottom so as to allow the expansion unit to project downward from the body of the notebook PC.

The expansion unit 400 includes a base portion 410, a CCD camera 420, a shaft 430, and a slide portion 440. The base portion 410 includes a connector 412 connectible to the notebook PC 100, and a projection 413 that may fit the opening 64. The connector 412 is connected to the CCD camera 420 via a cord, cable or other connection member formed in the shaft 430.

The CCD camera 420 is connected to the base portion 410 via the shaft 430, and may be stored in the base portion 410 by the slide portion 440 as shown in FIG. 6. The CCD camera 420 includes a movable portion 422, an anchor portion 424, and a lens 426. The movable portion 422 is connected to the anchor portion 424 rotatably in an arrow direction A through a shaft (not shown) or other mechanism. The anchor portion 424 is connected to the shaft 430 rotatably in an arrow direction B. Since any structures known in the art may be applied to the lens 426 and its imaging structure, a detailed explanation will now be omitted. As described above, the shaft 430 contains a connection member (not shown) that connects the CCD camera 420 to connector 412 and thus enables an image captured by the lens 426 to be displayed on the LCD screen 12. A user may edit captured images using image-editing software known in the art.

The slide portion 440 serves to slide the CCD camera 420 relative to the base portion 410 between storage and operable positions. FIG. 6 shows the CCD camera 420 at the storage position. FIGS. 4, 5, 7, 8, and 9 show the CCD camera 420 at the operable position.

The slide portion 440 includes a release button 442, retaining means 444, forcing means 446, and a movable portion 448. The retaining means 444 is connected to the release button 442 and releases, when the button 442 is pressed, the movable portion 448. The movable portion 448 is forced in the arrow direction C by the forcing means 446, which is made up, for example, of a compression spring or the like, and moves in the arrow direction C when the retaining means 444 is released. Consequently, if the button 442 is pressed, the CCD camera 420 moves in the arrow direction C to the operable position together with the movable portion 448. When the CCD camera 420 at the operable position is moved in an arrow direction D against the forcing means 446 to the storage position, the retaining means 444 and the movable portion 448 are engaged, making the release button 442 jut out and stop. Such a mechanism for automatically popping up the CCD camera 420 out of the base portion 410 by the button press or the like may be referred to as "pop-up mechanism" in this application. Thus, the CCD camera 420 is retained at the storage position shown in FIG. 6. It goes without saying that the slide portion 440 is not limited to this mechanism, and the mechanism illustrated in FIG. 9 is exemplary purposes only and thus not shown in other drawings. For example, a user may manually draw out the CCD camera 420 from the base portion 410.

The CCD camera 420 is normally held at the storage position until the expansion unit 400 is loaded into the expansion bay slot 60. After the expansion unit 400 is loaded and the release button is pressed, the CCD camera pops out of the base portion 410 as shown in FIG. 5 and a user then raises the CCD camera 420 about the shaft 430 (i.e., in the arrow direction B) as shown in FIG. 4. As necessary the user rotates the movable portion 422 in the arrow direction A to adjust a desired orientation of the lens 426, then starts image capturing. It is understood that the shaft 430 and means for connecting the movable portion 422 and the anchor portion 424 serve as an angle adjusting mechanism for adjusting an angle of the CCD camera 420 that has popped out of the base portion 410, relative to the base portion 410.

Although the illustrative embodiment uses the release button 422 to pop up the CCD camera 420, not a button but a lever, slider or any other operation means for releasing the retaining means 444 may be use.

Although not shown in FIGS. 4 through 8, the expansion unit 400 is provided with the connector 203 or 205 shown in FIG. 2. Corresponding thereto, the notebook PC body 100 is provided with the interfaces 72 and 74 as shown in FIG. 2. These connector and the interfaces electrically connect the CCD camera 420 in the expansion unit 400 and the notebook PC to each other through, and facilitate data transmission from the CCD camera 420 to the notebook PC 100. Control information is also transmitted from the notebook PC body to the CCD camera 420. In the preferred embodiment, the CCD camera 420 is, as shown in FIG. 2, connected via a USB cable with the notebook PC body.

This storage structure enables the CCD camera 420 not in use to be stored in the notebook PC (i.e., inside the expansion unit) prevent its popping out, thereby enhancing portability of the notebook PC. Moreover, when the CCD camera 420 is stored, this structure protects the lens of the CCD camera 420.

Figure 10:
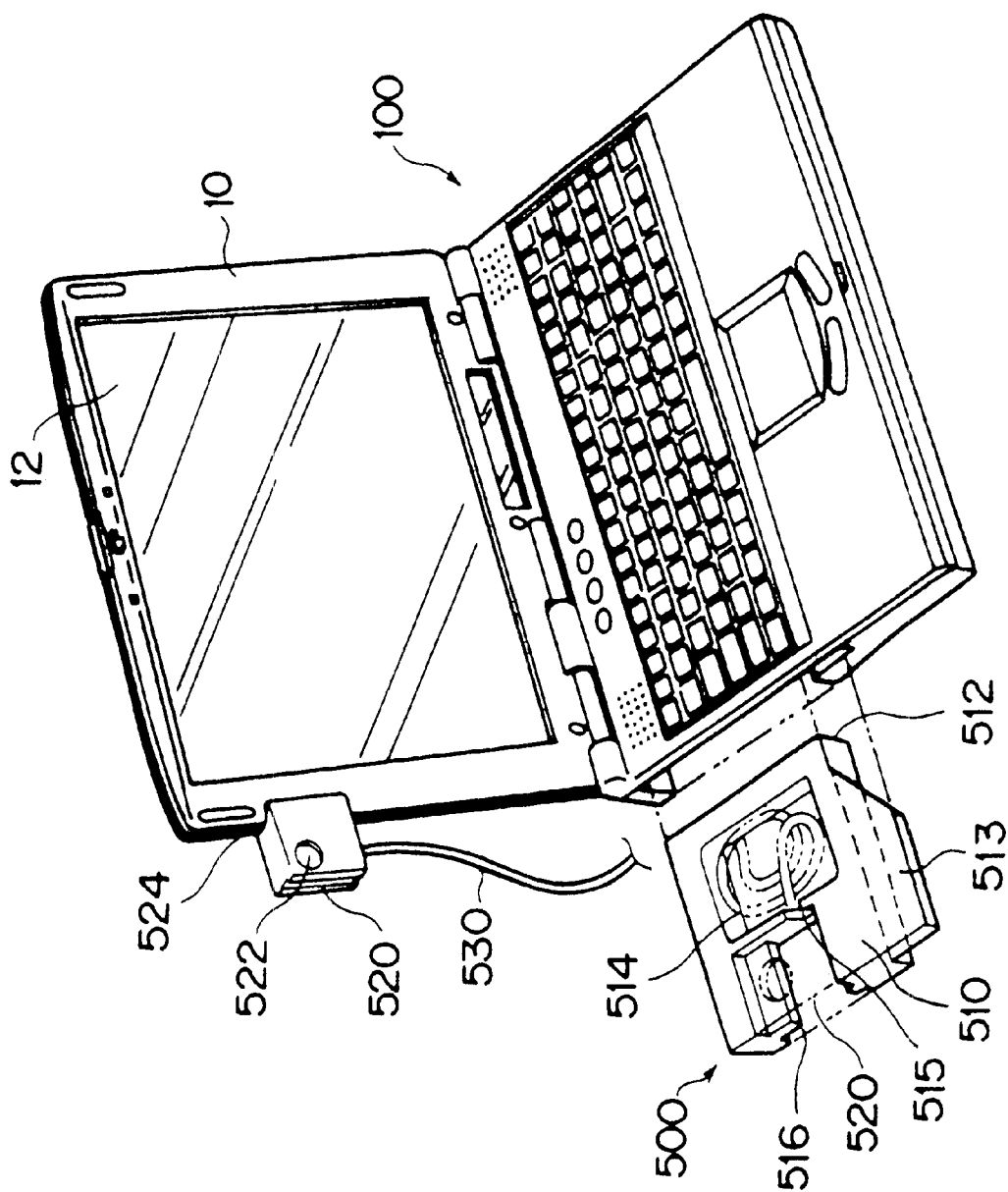
FIG. 10 is a schematic perspective view of another expansion unit inserted into the notebook PC shown in FIG. 1, which has a CCD camera in use., different from that shown in FIG. 4.

A description will be given of the expansion unit 500 including the CCD camera 520 with reference to FIG. 10. FIG. 10 is a schematic perspective view of expansion unit 500 loaded into the notebook PC 100 and having a CCD camera 520 in use. The expansion unit 500 includes a base portion 510, a CCD camera 520, and a cable or cord 530. The base portion 510 includes a connector 512 for connection with the notebook PC 100, a projection 513 to be inserted into the opening 64, a cable storage portion 514, a hole 515, and a camera storage portion 516.

The CCD camera 520 includes a lens 524 and a clip portion 524. The CCD camera 520 may be separated from the base portion 510, and attached by the clip portion 524 onto an LCD bezel frame 10 or any other desired position (such as a book shelf, a desk corner, and partition). Selectively, the lens 524 may be configured to be angularly changeable. The CCD camera 520 can be housed in the camera storage portion 516 of the base portion 510.

Although FIG. 10 illustrates the CCD camera 520 mounted at the side of the. display 10, the figure is for illustrative purposes only as described above, and it may be mounted at the top of the display 10.

The cable 530 can be housed in the cable storage portion 524 of the base portion 510, and led out through the hole 515 provided on a wall between the cable storage portion 514 and the camera storage portion 516. The cable 530 connects the CCD camera 520 with the connector 512. The cable 530 can ensure a shooting range of the CCD camera 520 as far as it extends. An image captured by the CCD camera 520 is seen on the LCD screen 12. A user can edit the image using image-editing software known in the art. Instead of the cable 530, the CCD camera 520 may use wireless communication means such as an infrared data communication to communicate with the base portion 510.

Among infrared data communication protocols, IrDA known in the art may be utilized, as a great number of the notebook PCs may be equipped with an IrDA port. The IrDA port, though not shown in FIG. 10. may be provided at any place on the body of the notebook PC 100. In that event, information captured from the CCD camera 520 is transmitted directly to the notebook PC 100. Alternatively, an infrared data communication device may be provided on the CCD camera 520 and the base portion 510. In that event, data from the CCD camera 520 is received by the base portion 510, and transmitted as an electric signal from the connector 512 of the base portion 510 through the connector portion 70 to (the processor of) the notebook PC 100.

The expansion bay slot of the notebook PC body 100 in FIG. 10 may have or may not have an opening at its bottom. Since the expansion unit 500 in FIG. 10 is designed to fit the thickness of the notebook PC body 100, the opening at its bottom as shown in FIG. 1 is not required. However, when a single notebook PC is required to be compatible with both structures shown in FIGS. 1 and 10, the expansion bay slot in the body of the notebook PC 100 may include an opening at its bottom so as to allow the expansion unit to project downward from the body of the notebook PC.

Although not shown in FIG. 10, the expansion unit 400 includes the connector 203 or 205 shown in FIG. 2. In response, the notebook PC body 100 includes the interfaces 72 and 74 shown in FIG. 2. These connectors and interfaces electrically connect the CCD camera 420 of the expansion unit 400 and the notebook PC to each other, and enable data transmission from the CCD camera 420 to the notebook PC. Similarly, control information from the notebook PC body to the CCD camera 420 is transmitted. In a preferred embodiment, the CCD camera 420 is connected with the notebook PC body via a USB cable as shown in FIG. 2.

A description has been given of the CCD camera with reference to FIGS. 4 to 10 inclusive. The above CCD camera is built in the expansion unit and the expansion unit is loaded into the notebook PC body, but the CCD camera itself may be designed to be loaded into the notebook PC. This configuration can be explained using FIGS. 4 and 5. In the present embodiment, the CCD camera shown in FIGS. 4 and 5 is attached to the notebook PC 100 itself rather than the expansion unit. This may be realized by providing a structure capable of sliding/popping out shown in FIGS. 7, 8 and 9 to the notebook PC 100 itself. This structure enables the CCD camera in a state shown in FIG. 4 to be laid down as in FIG. 5, and thereafter to be stored in the notebook PC. The CCD camera may be slid out as appropriate when used. This structure thus allows the CCD camera not in use to be stored in the notebook PC, preventing its inadvertent popping out and enhancing its portability. It also protects the lens of the CCD camera.

Figure 11:
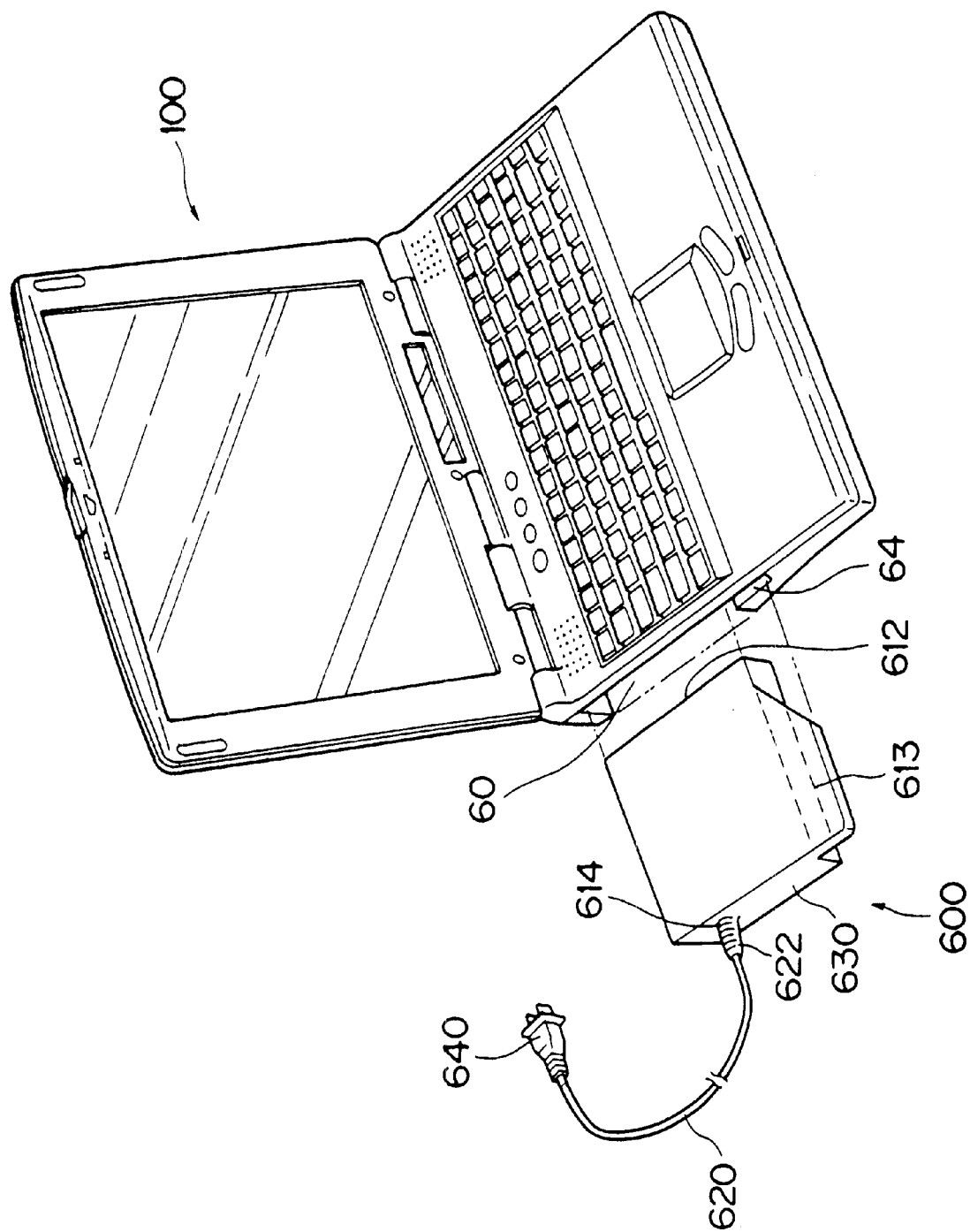
FIG. 11 is a schematic perspective view of the notebook PC shown in FIG. 1, and an expansion unit including an AC adapter.

Next, a description will be given of an expansion unit 600 including an AC adapter with reference to FIG. 11. FIG. 11 is a schematic perspective view of the notebook PC shown in FIG. 1 and the expansion unit 600 including an AC adapter. As described above, if the expansion unit including an AC adapter is a thick expansion unit, the expansion bay slot in the notebook PC shown in FIG. 11 should have an opening at a bottom as shown in FIG. 1. However, the notebook PC may eliminate the bottom opening if the expansion unit 600 shown in FIG. 11 is designed to fit a thickness of the notebook PC 100.

The expansion unit 600 includes a base portion 610. an AC cord 620, and a plug 640 at an end of the AC cord opposite to the expansion unit 600. The base portion 610 includes an adapter portion (not shown) within the base portion, a connector 612 to the notebook PC 100, and a projection 613 fitted in an opening 64. The adapter portion converts a specified voltage (AC 100V) to another specified voltage corresponding to the standard of an electronic apparatus. The adapter portion is located in the base portion 610. Any technique known in the art may be applied to the AC adapter, and a detailed description thereof will thus be omitted. The connector 612 is connected to the adapter portion directly or via a cable and cord (not shown). The adapter portion is also connected to the AC cord. The AC cord 620 is electrically connected to the connector via the adapter portion. The AC cord 620 that extends from the adapter portion projects from a cord outlet 614 on a side 630 of the expansion unit 600. The AC cord 620 extending from the cord outlet 614 may have a predetermined length in view of user's operating conditions. In addition, the AC cord 620 includes a protection member 622 for preventing deterioration of the AC cord 620 by a bending or twisting that would occur near the cord outlet 614. The AC cord 620 includes a plug 640 at an end opposite to the adapter side.

The expansion unit 600 includes a connector 203 or 205 shown in FIG. 2, though not shown in FIG. 11. Corresponding to these connectors, the notebook PC 100 includes interfaces 72, 74 shown in FIG. 2. These connectors and interfaces provide an electric connection between the AC cord 620 of the expansion unit 600 and the notebook PC. When the plug 640 is inserted into an AC power supply for home use (AC 100V), a current flows from the AC cord, a voltage drops down to a predetermined voltage applicable to the notebook PC 100 via the adapter portion, and a power is supplied to the notebook PC 100 through the connector.

A description will now be given of another embodiment of the expansion unit including an AC adapter. with reference to the expansion unit 600. The expansion unit includes a base portion, an AC cord. and a plug at an end of the AC cord opposite to the expansion unit. The base portion includes an adapter portion (not shown) within the base portion, a connector to the notebook PC, and a projection fitted into an opening.

The base portion forms a concave at a side on which the AC cord projects, and thereby forms a space having an opening inside the base portion. The space in the expansion unit may be used as an AC cord storage portion for accommodating the AC cord. The AC cord can be stored by folding the cord. The expansion unit is provided with a cover fitted into the opening of the AC cord storage portion, and the attachment of the cover serves to prevent the stored AC cord from going out. The cover may also be attached to the expansion unit using a hinge structure or a spring. The size of the AC cord storage portion is determined by the sizes of the adapter portion, base portion, and AC cord. The other structures of the base portion are the same as those in the expansion unit 600, and a detailed description thereof will thus be omitted.

If the expansion unit including an AC adapter is a thick expansion unit, the expansion bay slot in the notebook PC should have an opening at a bottom as shown in FIG. 1. However, the notebook PC may eliminate a bottom opening if the expansion unit is designed to fit a thickness of the notebook PC 100.

The above expansion unit can accommodate the AC cord in the expansion unit, and thus the AC cord never obstructively hangs down in carrying the PC. The hanging cord is never trod on and destroyed.

The before mentioned AC adapter means or includes a converter converting a commercial power supply to a power supply driving the electronic apparatus, a converter converting an external power supply to a power supply driving the electronic apparatus a converter converting an alternating current power supply to a direct current power supply or the like.

Next, a description will be given of an expansion unit including a position detecting information receiver. The expansion unit including a position detecting information receiver can serve as a GPS (Global Positioning System) in cooperation with a notebook PC. A GPS may detect a two-dimensional position (using the latitude and longitude) only by receiving radio waves from at least three GPS satellites that orbit at an altitude of 21,000 km in the sky. It may detect a three-dimensional position (additionally using the altitude) by receiving radio waves from four or more satellites.

Figure 12:
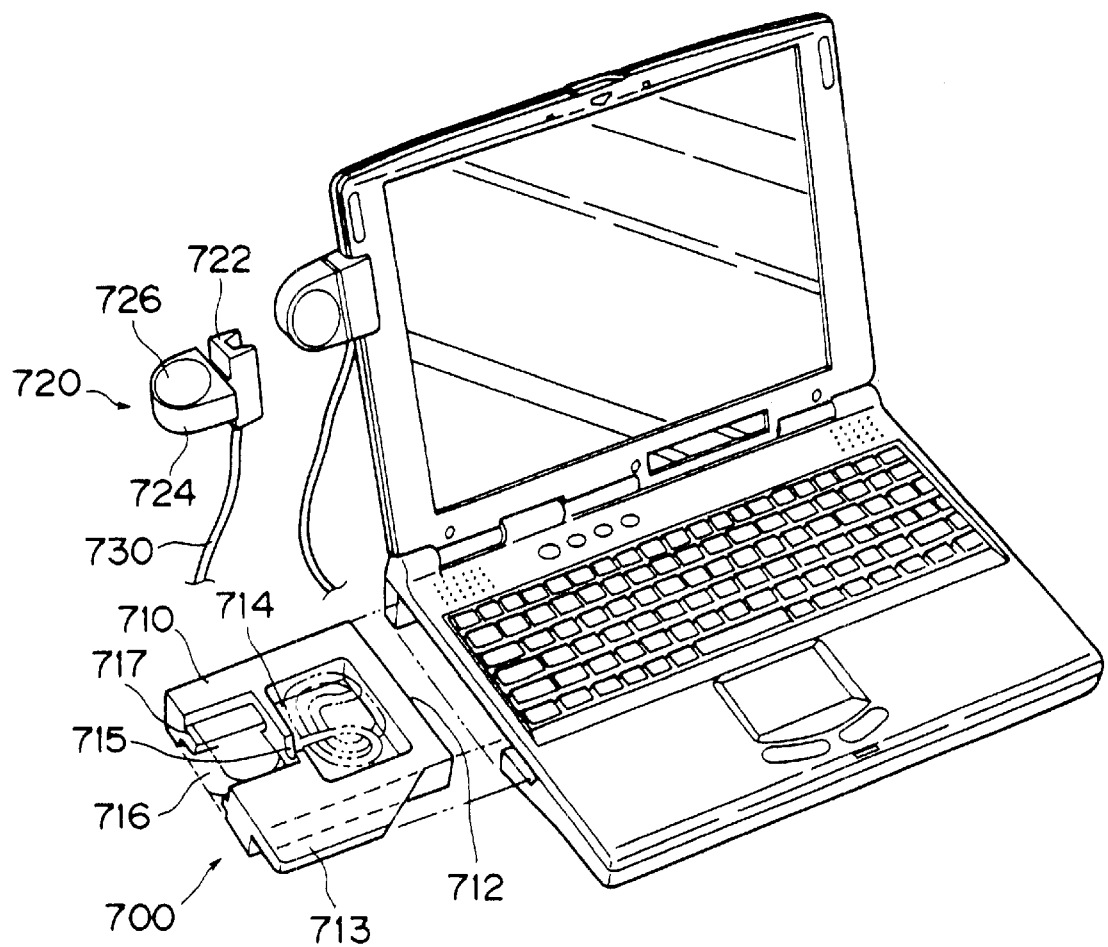
FIG. 12 is a schematic perspective view of the notebook PC shown in FIG. 1, and an expansion unit including a position detecting information receiver.

Referring to FIG. 12, a description will be given of another embodiment of an expansion unit 700 including a position detecting information receiver. FIG. 12 is a schematic perspective view of the notebook PC 100 shown in FIG. 1 and the expansion unit 700 including a position detecting information receiver. The expansion unit 700 includes a base portion 710, an antenna portion 720, and a cable or cord 730.

The base portion 710 includes a connector 712 connected to the notebook PC 100, a projection 713 fitted into an opening 64, a cable storage portion 714, a hole 715, an antenna storage portion 716, and an engagement portion 717.

The antenna portion 720 includes a patch antenna 726, a clip portion 722, an antenna case 724, and a hollow-axis shaft (not shown). The patch antenna 726 is constructed of a metal material bonded on an opposite side of a high dielectric material. The metal materials used for the antenna may be selected from, for example, copper, aluminum, composites, and the like. The high dielectric material may be a substrate composed of ceramic or fiberglass. The metal material receives radio frequency signals. Therefore, a surface of the metal material is etched so as to obtain the best receiving property based upon a dielectric constant of the material used for forming the substrate and the projection, a size and receiving frequency of the metal material. Structures usable for the patch antenna 726 is not limited to the above, and any structure known in the art may be used.

As illustrated in FIG. 12, the patch antenna 726 is configured to expose its metal surface out of the antenna case 724. Alternatively, the patch antenna 726 may be configured to have its surface covered with the antenna case 724. Covering the patch antenna 726 with the antenna case 724 serves to protect the patch antenna 726. In this event, the antenna case 724 is preferably formed of a material of a high radio-wave transmittance.

The antenna case 724 containing the patch antenna 726 is connected to the clip 722 via the hollow-axis shaft (not shown). Using the shaft gives the antenna case 724 a rotatable structure relative to the clip portion 722 (see FIG. 12). The patch antenna 726 is connected to a cable 730 that is connected to the clip portion 722 via a cord, cable or any other connecting member formed within the shaft.

The antenna portion 720 may be separated from the base portion 710, and attached onto the LCD bezel frame 10 or any other desired position (such as a book shelf, desk corner, and partition) via the clip portion 722. The patch antenna 726 can be tilted up or down to a preferred position for receiving purposes by rotating the antenna case 724 relative to the clip portion 722, and can thereby ensure the best receiving conditions. Although the antenna portion 720 is attached to the side of the display portion 10 in FIG. 12, the illustration is for exemplary purposes only as discussed above. It may be attached on the top of the display portion 10.

The antenna portion 720 can be stored in the antenna storage portion 716 of the base portion 710. In this event, the antenna portion 720 is attached to the engagement portion 717 via the clip portion 722, and thereby, fixed in the antenna storage portion 716.

The cable 730 can be stored in the cable storage portion 714 of the base portion 710, and extend out through the hole 715 provided on a partition between the cable storage portion 714 and the antenna storage portion 716. The cable 730 connects the antenna portion 720 to the connector 712. The cable 730 may ensure the radio-wave detecting range of the antenna portion 720 as far as it extends.

The information received by the antenna portion 720 is transmitted to the notebook PC. A user can know his/her current position by using application software for a GPS receiving process known in the art. When the application software is loaded and executed in the notebook PC, the expansion unit 700 converts received radio waves into a GPS signal, and transmits it to the notebook PC. The notebook PC, upon receipt of the GPS signal, performs a computation and works out his/her current latitude and longitude.

The antenna portion 720 includes a button (not shown). By pressing the button, the expansion unit 700 commences the conversion of received radio waves into a GPS signal, and the transmission thereof to the notebook PC. Transmitted data is temporally stored in a memory means. The stored data is read out by the application software for a GPS receiving process, and works out positioning information with a time when the button is pressed. Provision of such a button facilitates tracing a history based upon stored information without detecting a real time position as described above. The button on the antenna portion 720 may be dispensed with, as the above operations may be performed with the keyboard 40 or other operation means.

The antenna portion 720 may communicate with the base portion 710 using a wireless means such as infrared communications, etc., in place of the cable 730. The infrared communication may use an IrDA standard known in the art because lots of notebook PCs include a sending/receiving port conforming with the IrDA standard. The IrDA port, though not shown in FIG. 12, may be provided in any portion of a main body of the notebook PC 100. In this embodiment, information obtained through the antenna portion 720 is directly transmitted to the notebook PC 100. Alternatively, the infrared communication device may be provided in the antenna portion 710 and the base portion 710. In this embodiment, data from the antenna portion 720 is received by the base portion 710, and transmitted as an electric signal from the base portion 710 via the connectors 712 and 70 to (a processor of) the notebook PC 100.

The expansion bay slot in the notebook PC shown in FIG. 12 may, but not necessarily, include an opening at a bottom as shown in FIG. 1. The expansion unit 700 in FIG. 12 is designed to fit the thickness of the notebook PC 100, and thus requires no opening at the bottom as in FIG. 1. However, if both configurations in FIGS. 1 and 12 are desired in one set of the notebook PC, the notebook PC body 100 may include an opening at a bottom of the expansion bay slot, so that the expansion unit may project down out of the notebook PC body.

The expansion unit 700 (not shown in FIG. 12) includes the connector 203 or 205 shown in FIG. 2. Corresponding to these connectors, the notebook PC 100 includes interfaces 72, 74 shown in FIG. 2. These connectors and interfaces provide an electric connection between the antenna 720 of the expansion unit 700 and the notebook PC. Through these connectors, data from the antenna 720 is transmitted to the notebook PC. In a preferred embodiment, the antenna 720 is connected to the notebook PC body and data is transmitted in a USB signal form as shown in FIG. 2.

This storable configuration thus facilitates portability etc. of the notebook PC, because the antenna portion 720 when unused is stored in, not projecting from, the notebook PC (i.e., within the expansion unit). Moreover, when the patch antenna 726 is configured to expose its surface,. storing the antenna portion 720 would protect the metal material of the patch antenna 726.

Another embodiment of the expansion unit including a position detecting information receiver is replaced in shape with the expansion unit 210 that projects from the left side of the notebook PC shown in FIG. 1. Each portion of the expansion unit including a position detecting information receiver is assigned the same name as that of a corresponding portion of the expansion unit 210.

The expansion unit including a position detecting information receiver includes a first projection that projects from the notebook PC 100, and a base portion. The first projection accommodates an antenna for a GPS. The base portion includes a connector to the notebook PC, and a second projection that is fitted in the opening 64.

The first projection serves as an antenna capitalizing its projecting shape. The antenna capability is realized by using a patch antenna. The patch antenna has a similar structure to the above, and a detailed description thereof will thus be omitted. Optionally, the metal material of the patch antenna may is exposed onto a surface of the first projection, or stored in the projection.

The shape of the first projection that projects from the notebook PC 100 is not limited to an L-shape as seen in the projection 214 of the expansion unit 210 shown in FIG. 1. As far as the antenna works, it may have any shape. Similarly, as far as the antenna receives GPS radio waves, it is not limited to the patch antenna.

The connector of the base portion is electrically connected to the patch antenna via a cable or a connector. This transmits information received by the patch antenna to the notebook PC. A user may know his/her current position using application software for a GPS receiving process known in the art. When the application software for a GPS receiving process in the notebook PC is loaded and executed the expansion unit including a position detecting information receiver converts radio waves received from satellites into a GPS signal, and transmits the signal to the notebook PC. The notebook PC that has received the GPS signal performs a computation and works out the current latitude and longitude. The expansion unit according to the present embodiment may also have a function corresponding to that of the button on the antenna portion 720 of the expansion unit 700 by including a button or other means in the projection.

The expansion unit includes the connector 203 or 205 shown in FIG. 2. Corresponding to these connectors, the notebook PC 100 includes interfaces 72, 74. These connectors and interfaces provide an electric connection between the antenna of the expansion unit and the notebook PC. Through these connectors, data from the antenna is transmitted to the notebook PC. In a preferred embodiment, the antenna is connected to the notebook PC body and data is transmitted in a USB signal form as shown in FIG. 2.

The expansion bay slot in the notebook PC body 100 may, but not necessarily, include an opening at a bottom as shown in FIG. 1. The expansion unit including a position detecting information receiver, if designed to fit the thickness of the notebook PC body 100, eliminates a bottom opening. However, the notebook PC body 100 may include an opening at a bottom of the expansion bay slot, so that the expansion unit may project down out of the notebook PC body.

Figure 13:
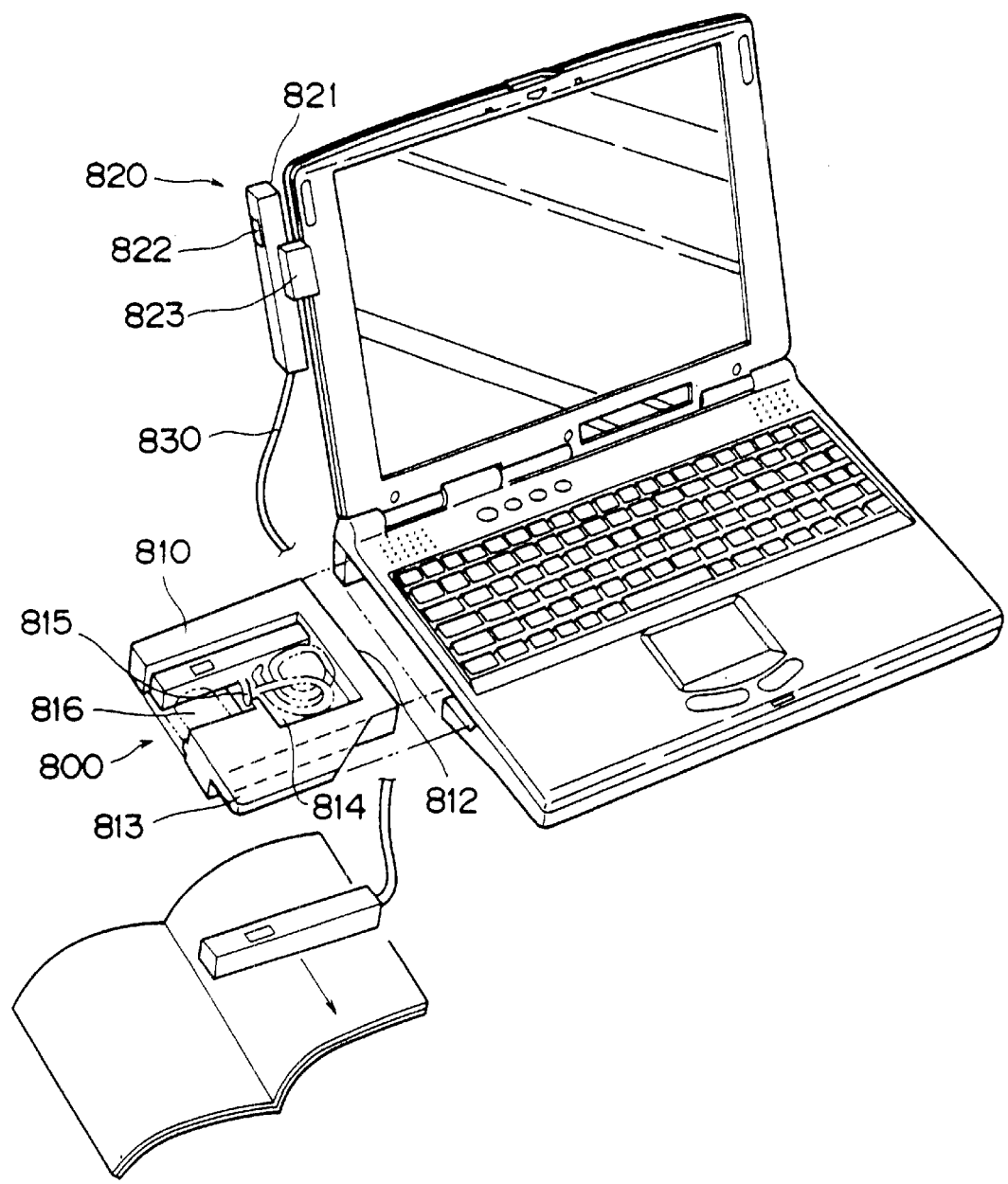
FIG. 13 is a schematic perspective view of the notebook PC shown in FIG. 1, and an expansion unit including an image-input device.

Referring to FIG. 13, a description will be given of an expansion unit 800 including an image-input device as another embodiment of the present invention. Hereupon, FIG. 13 is a schematic perspective view of the notebook PC shown in FIG. 1 and the expansion unit 800 including an image-input device. The expansion unit 800 serves as a scanner in cooperation with the notebook PC 100. The expansion unit 800 includes a base portion 810, a scanner portion 820, and a cable or cord 830.

The base portion 810 includes a connector 812 connected to the notebook PC 100, a projection 813 fitted in the opening 64, a cable storage portion 814, a hole 815, and a scanner storage portion 816.

The scanner portion 820 includes a scanning surface 821, a scan button 822 provided on a side opposite to the scanning surface 821, and an attachment portion 823. The scanning surface 821 is a contact-type sensor composed of a sensing element provided through a member made of tempered glass or the like. The attachment portion 823 may be separated from the base portion 810, and attached onto the LCD bezel frame 10 or any other desired position (such as a book shelf, desk corner, and partition). When the scanner portion 820 is stored, the attachment portion 823 fixes the scanner portion 820 on the scanner storage portion 816. A clip or other attachment means as used for the above expansion units 500 and 700 may be applied to the attachment portion 823. The scanner portion 820 is connected to a cable 830 that will be explained later.

The scanner portion 820 is a handy-type scanner that is known in the art. Any techniques known in the art may be applied to the scanner portion 820, and a detailed description thereof will thus be omitted. The scanner portion 820 can scan and recognize color, gray-scale or black-and-white binary images. The scanner portion 820 includes a 16.77 million-color palette and can recognize a full color. These values are for exemplary purposes only, and the present invention is not limited to these values.

The cable 830 can be stored in the cable storage portion 814 of the base portion 810, and extends out through the hole 815 provided on a partition between the cable storage portion 814 and the antenna storage portion 816. The cable 830 connects the scanner portion 820 to the connector 812. The cable 830 may ensure the movable range of the scanner portion 820 within a range of its length.

A user may input data using image-editing application software known in the art. The image-editing application software is loaded and executed in the notebook PC, and information input by the scanner portion 820 is transmitted to the notebook PC 100. In operation, the scanning surface 821 is brought into contact with a medium on which there is an image to be scanned, and slid across the medium in a fixed direction, whereby the image can be scanned. The scanning operation of the scanning surface 821 is switched on and off by the scan button 822. An LED or the like may be provided near the scan button. A user can easily recognize scanning ON/OFF based upon on and off of the LED. Further, the image-editing application software can be configured to run automatically upon switching ON of the scan button 822. Such a configuration can prevent a user from performing a scanning operation without running the image-editing application software in the notebook PC. This configuration allows the software to run only by pressing the scan button 822, and thus simplifies the user's operation.

The expansion unit 800 includes a connector 203 or 205 as shown in FIG. 2, though not shown in FIG. 13. Corresponding to these connectors, the notebook PC body 100 includes interfaces 72, 74 shown in FIG. 2. These connectors and interfaces provide an electric connection between the scanner portion 820 of the expansion unit 800 and the notebook PC. Through these connectors, data from the scanner portion 820 is transmitted to the notebook PC. In a preferred embodiment, the scanner portion 820 is connected to the notebook PC body and data is transmitted in a USB signal form as shown in FIG. 2.

The expansion bay slot in the notebook PC body 100 shown in FIG. 13 may, but not necessarily, include an opening at a bottom as shown in FIG. 1. The expansion unit 800 in FIG. 13 is designed to fit the thickness of the notebook PC body 100, and thus requires no opening at the bottom as in FIG. 1. However, if the configuration in FIG. 1 is desired in the notebook PC configured as in FIG. 13, the notebook PC body 100 may include an opening at a bottom of the expansion bay slot. so that the expansion unit may project down out of the notebook PC body.

The storable configuration as described above facilitates portability etc. of the notebook PC because the scanner portion 820 when unused is stored in, not projecting from, the notebook PC (i.e., within the expansion unit). The scanner portion 820 stored would protect the tempered glass in the scanning surface 821.

Figure 14:
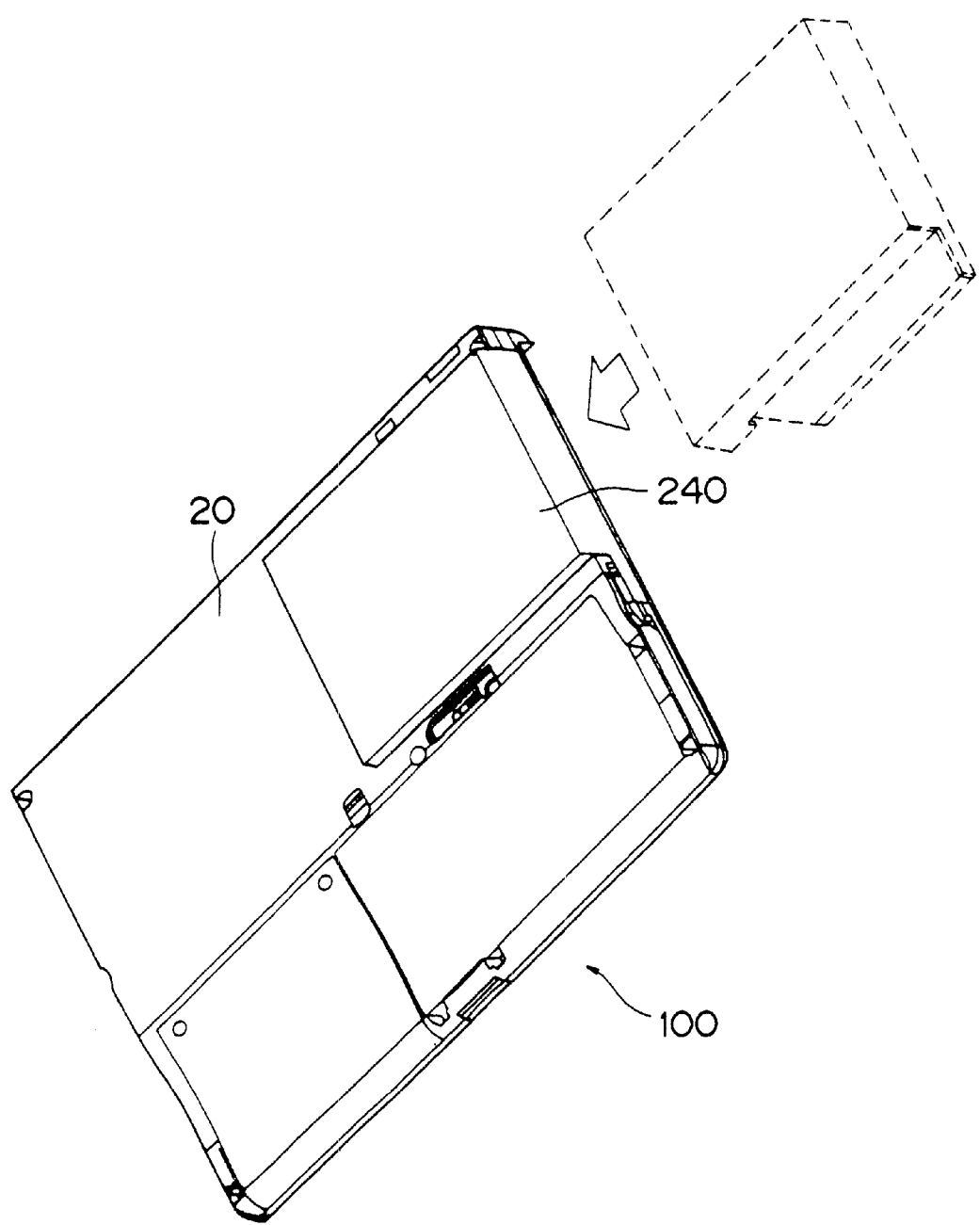
FIG. 14 is a schematic perspective view from a bottom of the notebook PC shown in FIG. 1, and a thick expansion unit.

A description will now be given of a notebook PC 100 including a thick expansion unit 140. FIG. 14 is a schematic perspective view from a bottom of the notebook PC 100 shown in FIG. 1, and the thick expansion unit 240. As shown in FIG. 14, the thick expansion unit 240 partially projects from a bottom of the base 20 by a thickness of a projection 244. The projection can make the notebook PC 100 tilt. Such a tilted notebook PC may ergonomically facilitate input operations through the keyboard 40 or the like.

Although the above embodiments use as an example the notebook PC which includes the expansion bay slot, the present invention is also applicable to a unit that may be inserted into an expansion bay slot provided in a so-called docking station, functional expansion device, expansion station, or the like which may be connected to the notebook PC. This specification does not intend to exclude such an embodiment from the scope of the present invention. The docking station, expansion device, and expansion station are disclosed, for example, in Japanese Laid-Open Patent Application Nos. 10-133778 and 9-6475. The docking station is sometimes referred to as functional expansion device for notebook PCs. The docking station, function expansion device, or expansion station typically has one or more peripherals that the notebook PC body does not include. The notebook PC is usually carried around by taking advantage of its portability, and is combined with (typically placed on, or coalesced at its back with) the docking station in an office to achieve as diverse functions as a desktop PC can or to use like a desktop PC. The present invention is also applicable if these devices are provided with the expansion bay. The phrase "expansion bay slot in an electronic apparatus" in the claim does not only imply such a configuration that a notebook PC or other electronic apparatus possesses a bay itself, but also includes an expansion bay for information processors, or expansion bay for use with information processors, and thus includes a bay provided in the above docking station or function expansion device. Moreover. some devices, like a device called expansion bay housing or docking bay, include only a bay without any peripheral. As these devices are integrated into the notebook PC and used, the phrase "expansion bay slot in an electronic apparatus" in the claim also covers these expansion bay housing and docking bay (device). These devices are not dissimilar to the expansion bay slot in an electronic apparatus.

Further, the devices as referred to above as docking station, function expansion device, expansion bay housing, or docking bay (device), once combined with the electronic apparatus, information processor, or portable electronic apparatus, constitutes a unit electronic apparatus, information processor, or portable electronic apparatus. Furthermore, the term 'information processor' conceptually includes a docking station, function expansion device, expansion bay housing, and docking bay (device) as such. Because the docking station or function expansion device includes a storage device or the like to process information in one form or another, and the expansion bay housing or docking bay (device) in turn, once loaded with any kind of units in its bay, may serve to process information in one form or another as a device for processing information. It is therefore to be understood that the phrase 'information processor' broadly covers various information-related apparatuses.

It is to be understood that the phrase 'portable electronic apparatus' comprehensively includes a notebook PC, a PDA, a portable terminal, a handheld PC, a palm-sized PC, a wearable computer.

The expansion bay slot for portable electronic apparatuses, as stated above, means not only an expansion bay slot provided in a portable electronic apparatus itself but also an expansion bay slot provided in the 'docking station, function expansion device, expansion bay housing or docking bay (device)'. It is because these 'docking station, function expansion device, expansion bay, housing, and docking bay (device)' are portable as well. Moreover, the expansion bay slot provided in the 'docking station, function expansion device, expansion bay housing, or docking bay (device)' is none other than the expansion bay slot utilized by the portable electronic apparatus that incorporates various expansion units through the 'docking station, function expansion device, expansion bay housing, or docking bay (device)'.

Notwithstanding the foregoing preferred embodiments of the present invention, various changes and modifications may be made without departing from the scope of the present invention.

As described above, the expansion unit and electronic apparatus according to an exemplified embodiment of the present invention may assist in realizing increased functionality through expansion units while keeping the electronic apparatus compact, lightweight, and low-profile.

What is claimed is:

1. An expansion unit comprising:
    a housing which can be inserted into an expansion bay slot in an electronic apparatus in a detachable manner; and a connector which is provided on said housing and electrically connectible with said electronic apparatus, wherein said housing partially projects from a bottom of said electronic apparatus when said housing is inserted into said electronic apparatus and said connector is connected with said electronic apparatus.

2. An expansion unit according to claim 1, wherein said projecting portion of said housing serves as a stand of said electronic apparatus.

3. An expansion unit according to claim 1, wherein said housing includes a card slot in which a card may be inserted.

4. An expansion unit according to claim 1, wherein said connector has an interface that can transmit a CardBus signal for a card.

5. An expansion unit according to claim 1, wherein said connector has an interface that can transmit a PCI bus signal.

6. An expansion unit according to claim 1, wherein said connector has a USB interface that can transmit a USB signal.

7. An expansion unit according to claim 1, wherein said connector has an interface that can transmit a file signal including data and programs which said electronic apparatus can handle.

8. An expansion unit according to claim 1, further comprises an image pickup device provided in said housing.

9. An expansion unit according to claim 1, further comprising a security device provided in said housing.

10. An expansion unit according to claim 1, further comprising a wireless communication device provided in said housing.

11. An expansion unit according to claim 1, further comprising a converter, provided in said housing, converting an external power supply to a power supply driving the electronic apparatus.

12. An expansion unit according to claim 8, further comprises a mechanism that is connected with said housing and allows said image pickup device to project from said housing.

13. An expansion unit according to claim 8, wherein said electronic apparatus includes a display device, wherein said image pickup device is mounted detachably onto said housing, wherein said expansion unit further comprises:

a cable that connects said image pickup device and said housing to each other; and a mounting mechanism that allows said image pickup device that has been detached, to be mounted on said display device of said electronic apparatus.

14. An expansion unit according to claim 12, wherein said mechanism allows said image pickup device to project from said housing by an operating means.

15. An expansion unit according to claim 9, wherein said security device is a biometric device.

16. An expansion unit according to claim 15, wherein said biometric device is any one of a fingerprint recognition device, a voiceprint recognition device, and a retina recognition device.

17. An expansion unit comprising:

a housing which can be inserted into an expansion bay slot in an electronic apparatus in a detachable manner; and a connector which is provided on said housing and electrically connectible with said electronic apparatus, wherein said housing partially projects from other than a bottom of said electronic apparatus when said housing is inserted into said electronic apparatus and said connector is connected with said electronic apparatus.

18. An expansion unit according to claim 17 further comprising a position detecting information receiver connected to said housing.

19. An expansion unit according to claim 2 further comprising an image-input device connected to said housing.

20. An expansion unit according to claim 18, wherein said housing that partially projects is an antenna for said position detecting information receiver.

21. An expansion unit according to claim 18, wherein said electronic apparatus includes a display device, wherein said position detecting information receiver is detachably provided on said housing, and wherein said expansion unit further comprises:

a cable that connects said position detecting information receiver to said housing; and an attachment mechanism that can attach said detached position detecting information receiver to said display device of said electronic apparatus.

22. An expansion unit according to claim 19, wherein said electronic apparatus includes a display device, wherein said image-input device is detachably provided on said housing, and wherein said expansion unit further comprises:

a cable that connects said image-input device to said housing; and an attachment mechanism that can attach said detached image-input device to said display device of said electronic apparatus.

23. An electronic apparatus comprising:

a housing including an expansion bay slot into which an expansion unit can be inserted in a detachable manner, said expansion bay slot opening at a bottom of said housing to allow said expansion unit to partially project from said bottom of said housing; and a connector which is provided in said housing and electrically connectible with said expansion unit.

24. An electronic apparatus comprising:

a first part having a slot;

a second part which can be inserted into said slot of said first part in a detachable manner; and an interface device which electrically connects said first and second parts to each other, wherein said second part partially projects from a bottom of said electronic apparatus when inserted into said slot on said first part and electrically connected with said first part through said interface device.

25. An electronic apparatus comprising:

a first part having a slot;

a second part which can be inserted into said slot of said first part in a detachable manner; and an interface device which electrically connects said first and second parts to each other, wherein said second part partially projects from said electronic apparatus when inserted into said slot on said first part and electrically connected with said first part through said interface device.

26. An expansion unit comprising:

a housing which can be inserted into an expansion bay slot provided in an electronic apparatus in a detachable manner; and a connector which is provided on said housing and electrically connectible with said electronic apparatus, wherein said connector has a USB interface that can transmit a USB signal.

27. An expansion unit according to claim 26, further comprising a USB terminal connectible with an external device.

28. An expansion unit comprising:
a housing which can be inserted into an expansion bay slot in an electronic apparatus in a detachable manner;
a connector which is provided on said housing and electrically connectible with said electronic apparatus; and
a USB terminal connectible with an external device.

29. An electronic apparatus comprising:
a housing including an expansion bay slot into which an expansion unit can be inserted in a detachable manner; and
a USB interface which is provided on said housing and can establish a USB connection with said expansion unit.

30. An expansion unit comprising:
a housing which can be inserted into an expansion bay slot provided in an electronic apparatus in a detachable manner;
an image pickup device which is provided in said housing; and
a connector which is provided on said housing and electrically connectible with said electronic apparatus.

31. An expansion unit according to claim 30, further comprising a mechanism that is connected with said housing and allows said image pickup device to be stored in said housing while said image pickup device projects from said housing.

32. An expansion unit according to claim 30, wherein said image pickup device is detachably provided in said housing.

33. An expansion unit according to claim 30, further comprising a cable that connects said image pickup device and said housing to each other.

34. An expansion unit according to claim 32, further comprising a mounting mechanism for use with said image pickup device that has been detached.

35. An expansion unit according to claim 33, wherein said housing includes a storage portion for said cable.

36. An expansion unit according to claim 33, further comprising an angular adjustment mechanism for adjusting an angle of said image pickup device which has projected from said housing, with respect to said housing.

37. An expansion unit comprising:
a housing which can be inserted into an expansion bay slot in an electronic apparatus in a detachable manner;
an image pickup device which is stored in said housing; and
a mechanism which is connected with said housing and allows said image pickup device to project from said housing.

38. An electronic apparatus comprising:
a first part having a slot;
a second part which is inserted into said slot of said first part in detachable manner;
an interface device electrically connecting said first and second parts to each other;
an image pickup device which is stored in said second part; and
a mechanism which is connected with said second part and allows said image pickup device to project from said second part.

39. An electronic apparatus according to claim 38, further comprising an angular adjustment mechanism for adjusting an angle of said image pickup device which has projected from said second part, with respect to said second part.

40. An electronic apparatus comprising:
a housing;
an image pickup device which is stored in said housing while projecting from said housing; and
an angular adjustment mechanism for adjusting an angle of said image pickup device which has projected from said housing, with respect to said housing, while maintaining an electric connection between said image pickup device and said housing.

41. An expansion unit comprising:
a housing which can be inserted into an expansion bay slot in an electronic apparatus in a detachable manner, and includes a plurality of card slots which can receive a plurality of cards; and
a connector which is provided on said housing and electrically connectible with said electronic apparatus.

42. An expansion unit comprising:
a housing which can be inserted into an expansion bay slot in an electronic apparatus in a detachable manner, and includes a plurality of card slots which are arranged side by side and can receive plural types of cards each having a different height; and
a connector which is provided on said housing and electrically connectible with said electronic apparatus.

43. An expansion unit comprising:
a housing which can be inserted into an expansion bay slot in an electronic apparatus in a detachable manner; and
a holder provided in said housing for a communication device.

44. An expansion unit according to claim 43, further comprising a connector that is provided on said housing and electrically connectible with said electronic apparatus.

45. An expansion unit according to claim 43, wherein said holder is stored in said housing and allowed to project from said housing.

46. An expansion unit according to claim 43, further comprising a connection member enabling a connection between said communication device and said electronic apparatus.

47. An expansion unit comprising:
a housing which can be inserted into an expansion bay slot in an electronic apparatus in a detachable manner;
a card reader provided in said housing; and
a connector which is provided on said housing and electrically connectible with said electronic apparatus.

48. An expansion unit comprising:
a housing which can be inserted into an expansion bay slot in an electronic apparatus in a detachable manner;
an image-forming device provided in said housing; and
a connector which is provided on said housing and electrically connectible with said electronic apparatus.

49. An expansion unit comprising:
a housing which can be inserted into an expansion bay slot in an electronic apparatus in a detachable manner;
an image-input device provided in said housing; and
a connector which is provided on said housing and electrically connectible with said electronic apparatus.

50. An expansion unit according to claim 49, further comprising a detachment mechanism that detaches said image-input device at least partially from said housing, and is provided on said housing.

51. An expansion unit according to claim 50, further comprising an attachment mechanism for said detached image-input device.

52. An expansion unit according to claim 50, further comprising a cable that connects said image-input device to said housing.

53. An expansion unit according to claim 52, wherein said housing further includes a storage portion for said cable.

54. An expansion unit according to claim 52, further comprising an angular adjustment mechanism for adjusting an angle of said image-input device detached from said housing, with respect to said housing.

55. An expansion unit comprising:
- a housing which can be inserted into an expansion bay slot in an electronic apparatus in a detachable manner;
- a converter, provided in said housing, converting an external power supply to a power supply driving the electronic apparatus; and
- a connector which is provided on said housing and electrically connectible with said electronic apparatus.

56. An expansion unit comprising:
- a housing which can be inserted into an expansion bay slot in an electronic apparatus in a detachable manner;
- a position detecting information receiver provided in said housing; and
- a connector which is provided on said housing and electrically connectible with said electronic apparatus.

57. An expansion unit according to claim 56, further comprising a detachment mechanism that detaches said position detecting information receiver at least partially from said housing, and is provided on said housing.

58. An expansion unit according to claim 57, further comprising an attachment mechanism for said detached position detecting information receiver.

59. An expansion unit according to claim 57, further comprises a cable that connects said position detecting information receiver to said housing.

60. An expansion unit according to claim 59, wherein said housing further includes a storage portion for said cable.

61. An expansion unit according to claim 59, further comprising an angular adjustment mechanism for adjusting an angle of said position-detection information-receiving device detached from said housing, with respect to said housing.

62. An electronic apparatus comprises:
- a housing including an expansion bay slot into which an expansion unit can be inserted in a detachable manner, said expansion bay slot opening at a bottom of said housing to allow said expansion unit to partially project from said bottom of said housing;
- a first connector which is provided in said housing and electrically connectible with a first expansion unit; and
- a second connector which is provided in said housing and electrically connectible with a second expansion unit.

63. An electronic apparatus according to claim 62, wherein said expansion bay slot is commonly used for said first and second expansion units.

64. An electronic apparatus according to claim 62, wherein said first connector has an interface that can transmit a file signal including data and programs which said electronic apparatus can handle.

65. An electronic apparatus according to claim 62, wherein one of said expansion bay slot and said expansion unit includes a guide portion, and the other includes a guide groove; and
wherein said expansion bay slot and said expansion unit establishes connection as a result of an engagement between said guide portion of said guide groove.

66. An electronic apparatus according to claim 62, wherein said second connector has an interface that can transmit a CardBus signal for a card.

67. An electronic apparatus according to claim 62, wherein said second connector has a USB interface that can transmit a USB signal.

68. An expansion unit comprising:
- a housing which can be inserted into an expansion bay slot in an electronic apparatus in a detachable manner;
- a bar code reader provided in said housing; and
- a connector which is provided on said housing and electrically connectible with said electronic apparatus.

69. An expansion unit comprising:
- a housing which can be inserted into an expansion bay slot in an electronic apparatus in a detachable manner;
- an infrared communication device provided in said housing; and
- a connector which is provided on said housing and electrically connectible with said electronic apparatus.

70. An electronic apparatus comprising:
- a housing;
- a battery unit; and
- an expansion bay slot that is provided in said housing, opens at a bottom of said housing and can load with said battery unit;
- wherein said battery unit partially projects from said bottom of said housing when loaded into said expansion bay slot to serve as a tilt for said housing.

71. An electronic apparatus according to claim 70, wherein said expansion bay slot is disposed in said housing at a side opposite to a user who operates said electronic apparatus.

72. An electronic apparatus according to claim 70, wherein said expansion bay slot is loadable with an expansion unit other than said battery unit.

73. An electronic apparatus comprising:
- a housing; and
- an expansion bay slot that is provided in said housing, loadable with at least one expansion unit, wherein said expansion bay slot opens at a bottom of said housing and can load with a battery unit; and
- wherein said battery unit partially projection from said bottom of said housing when loaded into said expansion bay slot to serve as a tilt for said housing.

74. An electronic apparatus according to claim 73, wherein said expansion bay slot is disposed in said housing at a side opposite to a user who operates said electronic apparatus.

75. An electronic apparatus according to claim 73, wherein said expansion bay slot is loadable with an expansion unit other than said battery unit.

76. A battery unit loadable into an expansion bay slot in an electronic apparatus, said electronic apparatus including a housing and said expansion bay slot, and said expansion bay slot opening at a bottom of said housing,
wherein said battery unit partially projects from said bottom of said housing when loaded into said expansion bay slot to serve as a tilt.

77. A battery unit loadable into an expansion bay slot in an electronic apparatus, said electronic apparatus including a housing and said expansion bay slot, and said expansion bay slot opening at a bottom of said housing,
wherein said battery unit partially projects from said bottom of said housing when loaded into said expansion bay slot to serve as a tilt for said housing.

78. An electronic apparatus which comprises a housing including an expansion bay slot, said expansion bay slot loadable with at least one expansion unit selected from a group including a battery unit, wherein said expansion bay slot opens at a bottom of said housing; and, wherein said battery unit partially projects from said bottom of said housing when loaded into said expansion bay slot to serve as a tilt for said housing.

79. An electronic apparatus according to claim 78, wherein said expansion bay slot is disposed in said housing at a side opposite to a user who operates said electronic apparatus.

80. An electronic apparatus according to claim 78, wherein said group includes an storage device, a USB interface, an AC adapter, a card, communication device, an image-forming device, an image-input device, an image pickup device, a position detecting information receiver, a card reader, a bar code reader, a security device.

81. An electronic apparatus comprising:

at least one expansion unit selected from a group including a battery unit; and a housing including an expansion bay slot into which said expansion unit is loadable, wherein said expansion bay slot opens at a bottom of said housing; and wherein said battery unit partially projects from said bottom of said housing when loaded into said expansion bay slot to serve as a tilt for said housing.

82. An electronic apparatus according to claim 81, wherein said expansion bay slot is disposed in said housing at a side opposite to a user who operates said electronic apparatus.

83. An electronic apparatus according to claim 81, wherein said group includes an storage device, a USB interface, an AC adapter, a card, communication device, an image-forming device, an image-input device, an image pickup device, a position detecting information receiver, a card reader, a bar code reader, a security device.

\* \* \* \* \*